United States Patent
Philpot

(10) Patent No.: US 11,526,552 B2
(45) Date of Patent: Dec. 13, 2022

(54) SYSTEMS AND METHODS OF OPTIMIZING THE USE OF USER QUESTIONS TO IDENTIFY SIMILARITIES AMONG A LARGE NETWORK OF USERS

(71) Applicant: Darrell Philpot, Manchester, NH (US)

(72) Inventor: Darrell Philpot, Manchester, NH (US)

(73) Assignee: Lyqness Inc., Manchester, NH (US)

( * ) Notice: Subject to any disclaimer, the term of this patent is extended or adjusted under 35 U.S.C. 154(b) by 9 days.

(21) Appl. No.: 16/996,077

(22) Filed: Aug. 18, 2020

(65) Prior Publication Data

US 2020/0380042 A1    Dec. 3, 2020

(51) Int. Cl.
| | |
|---|---|
| G06F 16/9032 | (2019.01) |
| G06F 16/23 | (2019.01) |
| G06F 16/25 | (2019.01) |
| G06Q 30/02 | (2012.01) |
| G06Q 50/00 | (2012.01) |

(52) U.S. Cl.
CPC .... *G06F 16/90332* (2019.01); *G06F 16/2365* (2019.01); *G06F 16/258* (2019.01); *G06Q 30/0203* (2013.01); *G06Q 30/0245* (2013.01); *G06Q 50/01* (2013.01)

(58) Field of Classification Search
CPC ........... G06F 16/90332; G06F 16/2365; G06F 16/258; G06Q 30/0203; G06Q 30/0245; G06Q 50/01
See application file for complete search history.

(56) References Cited

U.S. PATENT DOCUMENTS

| | | | |
|---|---|---|---|
| 8,510,385 B1 | 8/2013 | Najm et al. | |
| 8,622,835 B2 | 1/2014 | Bernard et al. | |
| 9,087,321 B2 * | 7/2015 | Neal | G06F 16/248 |
| 9,396,236 B1 | 7/2016 | Vanderwater et al. | |
| 9,398,450 B2 | 7/2016 | Ludwig et al. | |
| 10,043,191 B2 | 8/2018 | Peretti | |
| 10,140,883 B2 | 11/2018 | Wong et al. | |

(Continued)

OTHER PUBLICATIONS

Diaz F, Gamon M, Hofman JM, Kiciman E, Rothschild D (2016) Online and Social Media Data As an Imperfect Continuous Panel Survey. Plos One 11(1): e0145406. https://doi.org/10.1371/journal.pone.0145406 (Year: 2016).*

*Primary Examiner* — Dennis Truong
(74) *Attorney, Agent, or Firm* — Nolan IP Law; Jason M. Nolan

(57) ABSTRACT

A system and method for enabling users to create, view, respond to, query, search and collaborate on questions for the purpose of discovering similarities among themselves and others are provided. The methods can include synthesizing question responses into a question management architecture to facilitate computation and display of similarity for one or more respondents to a question or collection of questions, enabling users to create and share questions, and to optimize searching across a database of questions and associated media and enabling users to manage and interact with volumes of questions across a network of users. The methods can provide fidelity of measurement of user similarity based on question complexity and the user's question response choices; and facilitate the navigation of a database of questions that have been responded to and interacted with by a network of users to gain insight into who is like them.

21 Claims, 22 Drawing Sheets

(56) References Cited

U.S. PATENT DOCUMENTS

| | | | |
|---|---|---|---|
| 10,171,389 B2 | 1/2019 | Banerjee et al. | |
| 10,191,992 B2 | 1/2019 | Cederman-Haysom et al. | |
| 10,237,311 B2 | 3/2019 | Dange | |
| 10,621,183 B1 | 4/2020 | Chatterjee et al. | |
| 11,170,662 B2* | 11/2021 | Ahmad | G16H 40/63 |
| 2003/0200137 A1* | 10/2003 | Drummond | G06Q 30/02 |
| | | | 705/12 |
| 2008/0298386 A1 | 12/2008 | Fiatal | |
| 2009/0106080 A1* | 4/2009 | Carrier | G06Q 10/00 |
| | | | 705/7.32 |
| 2010/0145903 A1* | 6/2010 | Tuck | G01S 13/74 |
| | | | 706/54 |
| 2011/0066464 A1* | 3/2011 | George | G06Q 30/02 |
| | | | 705/7.32 |
| 2012/0167007 A1* | 6/2012 | Ross | G06Q 30/02 |
| | | | 715/811 |
| 2012/0239489 A1 | 9/2012 | Peretti et al. | |
| 2012/0246580 A1* | 9/2012 | Bouverat | G06Q 50/01 |
| | | | 715/753 |
| 2013/0238974 A1* | 9/2013 | Beltramo, Jr. | G06Q 30/02 |
| | | | 715/234 |
| 2013/0339445 A1* | 12/2013 | Perincherry | H04N 21/252 |
| | | | 709/204 |
| 2014/0257931 A1 | 9/2014 | Rinzler | |
| 2015/0051951 A1 | 2/2015 | Cederman-Haysom et al. | |
| 2015/0074515 A1 | 3/2015 | Seeman et al. | |
| 2015/0112737 A1 | 4/2015 | Saunders et al. | |
| 2015/0120718 A1* | 4/2015 | Luo | G06F 16/335 |
| | | | 707/728 |
| 2015/0172356 A1 | 6/2015 | Lieu et al. | |
| 2015/0223056 A1 | 8/2015 | Ludwig et al. | |
| 2015/0379126 A1 | 12/2015 | Livshits et al. | |
| 2016/0006775 A1* | 1/2016 | Baldwin | G06Q 50/01 |
| | | | 715/753 |
| 2016/0078458 A1 | 3/2016 | Gold et al. | |
| 2016/0110674 A1* | 4/2016 | Berman | G06Q 10/063112 |
| | | | 705/7.14 |
| 2016/0132912 A1* | 5/2016 | Beggy | G06F 3/01 |
| | | | 705/26.7 |
| 2016/0148222 A1* | 5/2016 | Davar | G06Q 50/01 |
| | | | 705/7.32 |
| 2016/0170962 A1* | 6/2016 | Johnson | G06F 40/211 |
| | | | 704/9 |
| 2017/0053186 A1* | 2/2017 | Allen | G06T 11/00 |
| 2017/0060982 A1* | 3/2017 | Akkiraju | G06F 16/285 |
| 2017/0116627 A1* | 4/2017 | Fedosseev | H04L 51/32 |
| 2017/0140338 A1* | 5/2017 | Willis | H04L 51/22 |
| 2017/0286558 A1 | 10/2017 | Kelleher | |
| 2017/0322620 A1 | 11/2017 | Schmitz | |
| 2018/0075500 A1* | 3/2018 | Hamadani | G06Q 30/0601 |
| 2018/0096369 A1* | 4/2018 | Kayton | G06Q 30/0203 |
| 2018/0240138 A1* | 8/2018 | Le | G06Q 30/0203 |
| 2018/0270185 A1 | 9/2018 | Pikor | |
| 2018/0293606 A1* | 10/2018 | Flynn | G06Q 30/0261 |
| 2018/0330802 A1* | 11/2018 | Sharifi Sedeh | G16H 10/60 |
| 2019/0213611 A1 | 7/2019 | Duhigg et al. | |
| 2020/0012969 A1* | 1/2020 | Jiang | G06K 9/6256 |
| 2021/0035155 A1* | 2/2021 | Khaled | G06Q 30/0245 |
| 2021/0149964 A1* | 5/2021 | Wang | G06F 40/205 |

\* cited by examiner

Embodiments of Measures of Similarity (MOS)

| | |
|---|---|
| Question Measure of Similarity versus a Target (QMOST) | A comparison of a user's question responses to those of a target user. Answers the question "How similar am I, in terms of my response to a question, to the target user?" |
| Collection Measure of Similarity versus a Target (CMOST) | A weighted comparison of a user's responses to questions in a collection to those of a target's responses to the same questions in the collection. Answers the question "How similar am I in terms of my responses to a collection of questions, given the complexity of the questions, to the target user?" |
| Question Measure of Similarity versus Respondents (QMOSR) | A comparison of a user's question responses to those of the question respondents. "How similar am I, in terms of my response to a question, to the respondents?" |
| Collection Measure of Similarity versus Respondents (CMOSR) | A weighted comparison of a user's responses to questions in a collection to those of respondents to the same questions in the collection. Answers the question of "How similar am I, in terms of my responses to the questions in the collection, given the complexity of the questions, to other respondents responses to questions in the collection?" |
| Question Interaction Similarity (QIS) | A comparison of a user's question interactions to those of a target user. Answers the question "How similar am I, in terms of my interactions to a question, to the target user?" |
| Collection Interaction Similarity (CIS) | A comparison of a user's interactions with questions in a collection to those of a target's interaction with the same questions in the collection. Answers the question "How similar am I in terms of my interactions with a collection of questions to the target user?" |
| Weight | Factor used to differentiate question complexity and baseline importance when computing collection CMOST and CMOSR for collections and is based on number of choices, range of choices, required number of selections and whether or not order of the selections matter. Additionally, users can influence the weighting by assigning a factor to indicate relative importance to them when computing similarity across collections. Answers the question "Is a particular question more significant, in terms of similarity, based on the probability of selecting the same choices as mine, given the complexity of the question?" |

700 — Question Measure of Similarity versus a Target (QMOST)
702 — Collection Measure of Similarity versus a Target (CMOST)
706 — Question Measure of Similarity versus Respondents (QMOSR)
708 — Collection Measure of Similarity versus Respondents (CMOSR)
712 — Question Interaction Similarity (QIS)
714 — Collection Interaction Similarity (CIS)
716 — Weight

FIG. 17

Embodiment of Question Definitions

| questionId | ownerId | text | choices | min selections | max selections | question type | range min | range max | buckets |
|---|---|---|---|---|---|---|---|---|---|
| 1 | a | Are you a morning, afternoon, evening or night person? | "morning", "afternoon", "evening", "night" | 1 | 1 | selection | | | 4 |
| 2 | b | Which of the following fruits do you eat most often? | "apples", "oranges", "bananas", "grapes", "pears", "cherries" | 1 | 6 | selection | | | 6 |
| 3 | c | How would you rank the following human needs in order of importance? | "relationships", "safety", "well being", "accomplishments", "achieving potential" | 5 | 5 | ordered selection | | | 5 |
| 4 | d | In what year did you first attempt to drive a car or truck? | "1920-1929", "1930-1939", "1940-1949", "1950-1959", "1960-1969", "1970-1979", "1980-1989", "1990-1999", "2000-2009", "2010-2019" | 1 | 1 | date | 1920 | 2019 | 10 |
| 5 | a | What are the first three things you routinely do in the morning and in which order do you do them? | "eat something", "smoke", "shower", "make bed", "drink water", "hit snooze", "use bathroom", "social media", "have coffee", "look out window" | 3 | 3 | ordered selection | | | 10 |

FIG. 18

Embodiment of Question Response Summaries

| questionId | order | choiceCounts | averages |
|---|---|---|---|
| 1 | 0 | 0,0,0,0 | |
| 2 | 0 | 0,0,0,0,0 | |
| 3 | 0 | 0,0,0,0 | |
| 3 | 1 | 0,0,0,0 | |
| 3 | 2 | 0,0,0,0 | |
| 3 | 3 | 0,0,0,0 | |
| 3 | 4 | 0,0,0,0 | |
| 4 | 0 | 0,0,0,0,0,0,0,0,0,0 | 0,0,0,0,0,0,0,0,0,0 |
| 5 | 0 | 0,0,0,0,0,0,0,0 | |
| 5 | 1 | 0,0,0,0,0,0,0,0 | |
| 5 | 2 | 0,0,0,0,0,0,0,0 | |

FIG. 19A

Embodiment of Question Interaction Summaries

| questionId | responded | watching | shared | liked |
|---|---|---|---|---|
| 1 | 0 | 0 | 0 | 0 |
| 2 | 0 | 0 | 0 | 0 |
| 3 | 0 | 0 | 0 | 0 |
| 4 | 0 | 0 | 0 | 0 |
| 5 | 0 | 0 | 0 | 0 |

FIG. 20A

Embodiment of Question Responses

| questionId | userId | selection | order | value |
|---|---|---|---|---|

FIG. 22A

Embodiment of Profile Interaction Summaries

| questionId | userId | isOwner | responded | watching | shared | liked | selections | value |
|---|---|---|---|---|---|---|---|---|
| 1 | a | 1 | 0 | 0 | 0 | 0 | | |
| 2 | b | 1 | 0 | 0 | 0 | 0 | | |
| 3 | c | 1 | 0 | 0 | 0 | 0 | | |
| 4 | d | 1 | 0 | 0 | 0 | 0 | | |
| 5 | a | 1 | 0 | 0 | 0 | 0 | | |

FIG. 21A

Embodiment of Question Response Summaries

| questionId | order | choieCount | averages |
|---|---|---|---|
| 1 | 0 | 2,1,1,0 | |
| 2 | 0 | 2,2,1,2,2,3 | |
| 3 | 0 | 0,2,1,1,0 | |
| 3 | 1 | 1,1,0,2,0 | |
| 3 | 2 | 2,0,1,1,0 | |
| 3 | 3 | 0,0,1,0,3 | |
| 3 | 4 | 1,1,1,0,1 | |
| 4 | 0 | 0,0,0,1,0,0,0,2,1,1 | 0,0,0,1955,0,0,0,1993, 5,2004,2010 |
| 5 | 0 | 0,0,1,0,0,1,2,0,0,0 | |
| 5 | 1 | 0,0,0,0,3,0,2,0,0,0 | |
| 5 | 2 | 0,0,2,0,1,0,0,1,1,0 | |

FIG. 19B

Embodiment of Question Interaction Summaries

| questionId | responded | watching | shared | liked |
|---|---|---|---|---|
| 1 | 4 | 3 | 2 | 4 |
| 2 | 4 | 5 | 2 | 1 |
| 3 | 4 | 2 | 2 | 3 |
| 4 | 5 | 3 | 3 | 2 |
| 5 | 5 | 2 | 2 | 3 |

FIG. 20B

Embodiment of Profile Interaction Summaries

| questionId | userId | isOwner | responded | watching | shared | liked | selections | value |
|---|---|---|---|---|---|---|---|---|
| 1 | a | 1 | 1 | 1 | 1 | 0 | 0 | |
| 1 | b | 0 | 1 | 0 | 1 | 1 | 2 | |
| 1 | c | 0 | 1 | 1 | 0 | 1 | 0 | |
| 1 | d | 0 | 0 | 1 | 1 | 0 | | |
| 1 | e | 0 | 1 | 0 | 0 | 1 | 1 | |
| 2 | a | 0 | 1 | 1 | 0 | 0 | 0,1,3,5 | |
| 2 | b | 1 | 1 | 1 | 1 | 0 | 1,2,4 | |
| 2 | c | 0 | 0 | 1 | 0 | 1 | | |
| 2 | d | 0 | 1 | 1 | 0 | 0 | 3,4,5 | |
| 2 | e | 0 | 1 | 1 | 1 | 0 | 0,5 | |
| 3 | a | 1 | 1 | 0 | 1 | 1 | 1,3,0,2,4 | |
| 3 | b | 0 | 1 | 1 | 0 | 1 | 1,0,3,4,2 | |
| 3 | c | 0 | 1 | 1 | 1 | 1 | 3,1,2,4,0 | |
| 3 | d | 0 | 1 | 0 | 0 | 0 | 2,3,0,4,1 | |
| 3 | e | 0 | 0 | 1 | 0 | 0 | | |
| 4 | a | 0 | 1 | 0 | 0 | 1 | 7 | 1997 |
| 4 | b | 0 | 1 | 0 | 1 | 1 | 3 | 1955 |
| 4 | c | 1 | 1 | 1 | 0 | 0 | 7 | 1990 |
| 4 | d | 0 | 1 | 1 | 1 | 1 | 8 | 2004 |
| 4 | e | 0 | 1 | 1 | 1 | 0 | 9 | 2010 |
| 5 | a | 1 | 1 | 1 | 0 | 1 | 6,4,2 | |
| 5 | b | 0 | 1 | 0 | 0 | 1 | 2,6,7 | |
| 5 | c | 0 | 1 | 0 | 1 | 0 | 6,4,2 | |
| 5 | d | 0 | 1 | 1 | 0 | 0 | 5,6,4 | |
| 5 | e | 0 | 1 | 0 | 0 | 1 | 9,4,8 | |

FIG. 21B

Embodiment of Question Responses

| questionId | userId | selection | order | value |
|---|---|---|---|---|
| 1 | a | 0 | 0 | |
| 1 | b | 2 | 0 | |
| 1 | c | 0 | 0 | |
| 1 | e | 1 | 0 | |
| 2 | a | 0 | 0 | |
| 2 | a | 1 | 1 | |
| 2 | a | 3 | 2 | |
| 2 | a | 5 | 3 | |
| 2 | b | 1 | 0 | |
| 2 | b | 2 | 1 | |
| 2 | b | 4 | 2 | |
| 2 | d | 3 | 0 | |
| 2 | d | 4 | 1 | |
| 2 | d | 5 | 2 | |
| 2 | e | 0 | 0 | |
| 2 | e | 5 | 1 | |
| 3 | a | 1 | 0 | |
| 3 | a | 3 | 1 | |
| 3 | a | 0 | 2 | |
| 3 | a | 2 | 3 | |
| 3 | a | 4 | 4 | |
| 3 | b | 1 | 0 | |
| 3 | b | 0 | 1 | |
| 3 | b | 3 | 2 | |
| 3 | b | 4 | 3 | |
| 3 | b | 2 | 4 | |
| 3 | c | 3 | 0 | |
| 3 | c | 1 | 1 | |
| 3 | c | 2 | 2 | |
| 3 | c | 4 | 3 | |
| 3 | c | 0 | 4 | |
| 3 | d | 2 | 0 | |
| 3 | d | 3 | 1 | |
| 3 | d | 0 | 2 | |
| 3 | d | 4 | 3 | |
| 3 | d | 1 | 4 | |

| questionId | userId | selection | order | value |
|---|---|---|---|---|
| 4 | a | 7 | 0 | 1997 |
| 4 | b | 3 | 1 | 1955 |
| 4 | c | 7 | 2 | 1990 |
| 4 | d | 8 | 3 | 2004 |
| 4 | e | 7 | 4 | 1997 |
| 5 | a | 6 | 0 | |
| 5 | a | 4 | 1 | |
| 5 | a | 2 | 2 | |
| 5 | b | 2 | 0 | |
| 5 | b | 6 | 1 | |
| 5 | b | 7 | 2 | |
| 5 | c | 6 | 0 | |
| 5 | c | 4 | 1 | |
| 5 | c | 2 | 2 | |
| 5 | d | 5 | 0 | |
| 5 | d | 6 | 1 | |
| 5 | d | 4 | 2 | |
| 5 | e | 9 | 0 | |
| 5 | e | 4 | 1 | |
| 5 | e | 8 | 2 | |

FIG. 22B

| questionid | userid | order matters | buckets | user selections | QMOSR | Weight |
|---|---|---|---|---|---|---|
| 1 | a | false | 4 | 1 | 33% | 1.78 |
| 1 | b | false | 4 | 1 | 0% | 1.78 |
| 1 | c | false | 4 | 1 | 33% | 1.78 |
| 1 | e | false | 4 | 1 | 0% | 1.78 |
| 2 | a | false | 6 | 4 | 63% | 2.30 |
| 2 | b | false | 6 | 3 | 22% | 2.78 |
| 2 | d | false | 6 | 3 | 44% | 2.78 |
| 2 | e | false | 6 | 2 | 30% | 3.08 |
| 3 | a | true | 5 | 5 | 20% | 5.16 |
| 3 | b | true | 5 | 5 | 20% | 5.16 |
| 3 | c | true | 5 | 5 | 13% | 5.16 |
| 3 | d | true | 5 | 5 | 27% | 5.16 |
| 4 | a | false | 10 | 1 | 83% | 6.56 |
| 4 | b | false | 10 | 1 | 55% | 6.56 |
| 4 | c | false | 10 | 1 | 81% | 6.56 |
| 4 | d | false | 10 | 1 | 81% | 6.56 |
| 4 | e | false | 10 | 1 | 77% | 6.56 |
| 5 | a | true | 10 | 3 | 58% | 4.64 |
| 5 | b | true | 10 | 3 | 31% | 4.64 |
| 5 | c | true | 10 | 3 | 58% | 4.64 |
| 5 | d | true | 10 | 3 | 33% | 4.64 |
| 5 | e | true | 10 | 3 | 46% | 4.64 |

FIG. 23

SYSTEMS AND METHODS OF OPTIMIZING THE USE OF USER QUESTIONS TO IDENTIFY SIMILARITIES AMONG A LARGE NETWORK OF USERS

BACKGROUND OF THE INVENTION

The methods and systems of the invention address gaps in the scope, depth and effectiveness of current polling and survey systems. The current art is centered on ways to create and administer surveys that focus on the creation of demographic data for marketing, opinion, and consensus measurement. The current power of the information collected benefits the collector and not the users who respond to the surveys. The deficiencies in the current art may be summarized as follows:

People are innately curious and use questions to learn about each other, experiences, activities, and the world in which we live. Current survey tools exploit this curiosity in two ways. Firstly, marketing, political, news, and other organizations ask questions, in the form of surveys to try and predict beliefs, behaviors, or attitudes. Secondly, the trend is increasing for surveys to be embedded into websites and social media feeds in order to fill gaps for more meaningful online engagements and to drive advertising revenue.

The current state of the art provides little return to the user on their information sharing investment. The users are generally provided with feedback that says "some percentage of people chose the following response(s)". If the survey question allows multiple responses to be provided, the user is left to do the math to ascertain what the result means in relation to him/her based on the disclosed percentages. There is always a link to "provide more information" and more importantly, keep you engaged to generate advertising revenue. Internal organization surveys often provide feedback in the vein of "some number of our internal colleagues chose/think/feel/would like . . . ". In both cases, the survey host is left to use statistical modeling to discern what survey demographics mean, with no indications of what actions they should take based on the results. Additionally, survey takers have little to no input to the survey development or analysis process nor do they have the ability to access or reuse the survey questions for their own purposes.

Another limitation with current systems is that they are often hosted by an individual or organization, either directly or through an intermediate survey tool/system/service. This results in the users providing bits and pieces of information across the online world that they have no subsequent access nor any aggregate view of what this says about them. While individual users have not been able to benefit from their information sharing investment, a growing number of data aggregators have. They cobble together the pieces of user information that they can access or purchase in order to build and sell demographic information, often back to marketers, political organizations, and commercial entities responsible for a majority of the surveys to begin with. Again, limited and transient benefit is accrued to the users of these surveys.

In summary, there exists a need in the art for an online, user-centric system of creating and responding to questions that shifts the benefits of the information exchange to favor the user. There also exists a need for large networks of users to be able to consistently and continuously view and interact with any question they respond to for the duration of the existence of the question and to be able to easily collaborate, use, and reuse the created questions to share and learn about each, thereby increasing their benefits from information shared.

BRIEF SUMMARY OF THE INVENTION

The invention relates to enabling a large network of users to create, respond, view responses, interact and view interactions with a large database of questions; view question responses and interactions in terms of their similarity to all respondents or to an individual respondent to a question; view responses to, and interactions with, a collection of questions in terms of similarity to all respondents, or to an individual respondent to questions in the collection; create collections of questions from all available questions, based on their interests, and view measures of similarity based on responses to and interactions with questions in the collection.

More specifically, methods and systems of the invention relate to:

synthesizing user inputted questions of varying complexity into a consistent question definition format that facilitates measurement of similarity;

capturing user responses to and interactions with a large database of questions by a large network of users;

computing measures of similarity between a user and other users who respond to or interact with a question, differentiating questions based on their complexity and a user's responses when computing similarity across a collection of questions;

computing measures of similarity across a collection of questions between a user and other users who responded to or interacted with a collection of questions leveraging the inventive methods to manage user input, interactions, displays of information as well as the creation, retrieval, update and deletion of data and computation of measures of similarity based on the inventive methods described herein.

BRIEF DESCRIPTION OF THE DRAWINGS

FIG. 17 is a table of embodiments of measures of similarity;

FIG. 18 is an embodiment of a table of question definitions;

FIG. 19A is an embodiment of an empty table of question response summaries;

FIG. 20A is an embodiment of an empty table of question interaction summaries;

FIG. 21A is an embodiment of a table of profile interaction summaries;

FIG. 22A is an embodiment of question responses;

FIG. 19B is a table of example question response summaries;

FIG. 20B is a table of example question interaction summaries;

FIG. 21B is a table of example profile interaction summaries;

FIG. 22B is a table of example question responses; and

FIG. 23 is a table of example question responses;

DETAILED DESCRIPTION OF THE INVENTION

Figure 1:
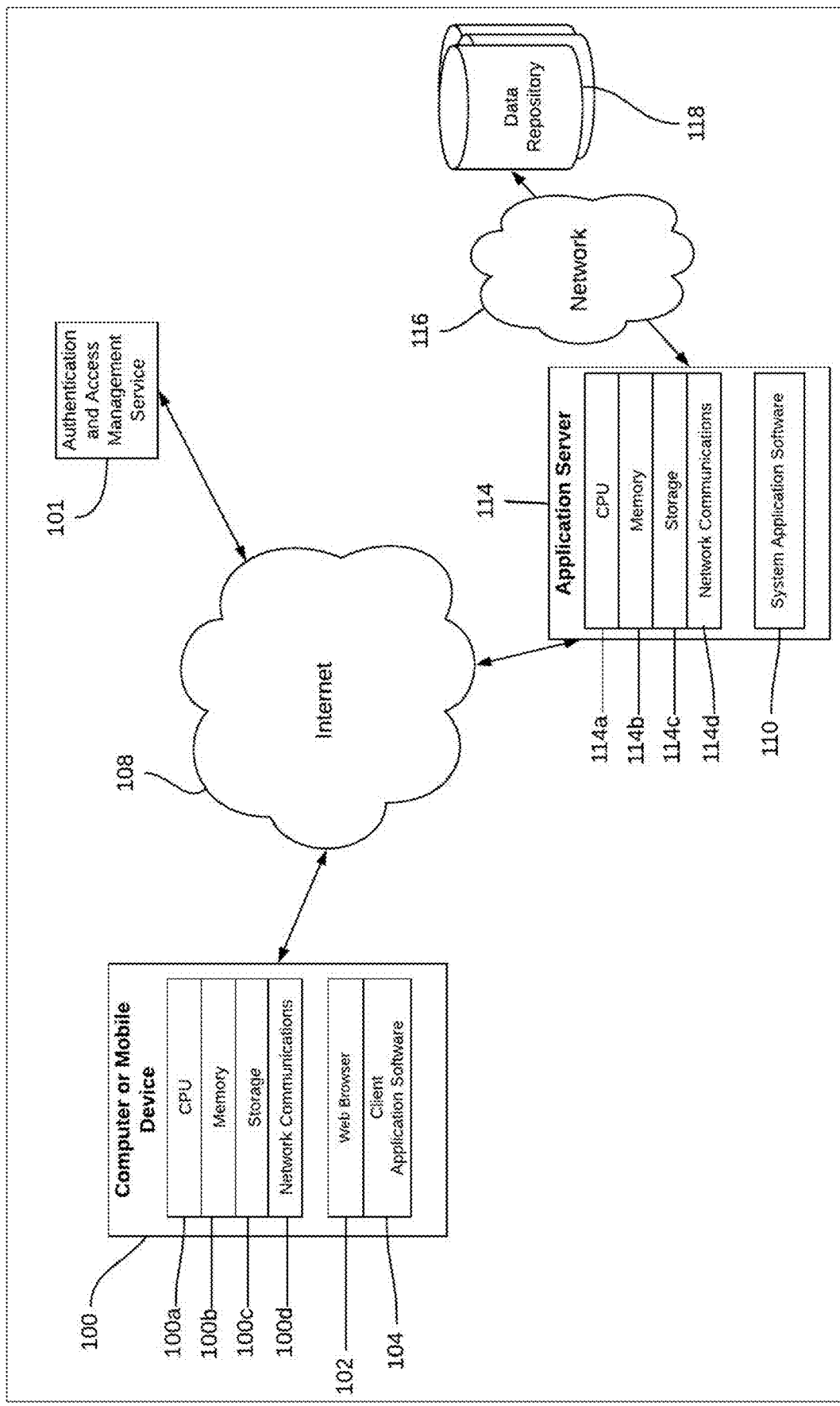
FIG. 1. is a top-level diagram of the methods and systems of the present invention.

An embodiment of the invention provides: a method of synthesizing user created questions into a format that facilitates measuring user similarity; a method of managing information associated with questions that facilitates navigation of the details associated with a large database of questions and user interactions; a method of synthesizing responses and interactions with questions into measures of similarity (MOS) and methods of weighting the significance of questions based on the complexity of the question and user responses and computing MOS for collections of questions and interactions.

As used herein, the terms "survey question" and "question" are intended to be synonymous.

The term "user" and "system user" are intended to be synonymous and refer to the current user of the system.

The term "systemId" is intended to refer to a unique identifier not associated with a user of the system.

The term "userId" is intended to refer to a unique identifier associated with the current user of the client application software 104 or the user identity associated with an access token that is validated by an authentication and access management service 101 when requests are made to the application program interfaces (APIs) of the system application software 110 and represents the current user of the client application software 104 who made the request.

The term "profileId" is intended to refer to an identifier that is unique and associated with a "profile" that is a collection of descriptive information about a user or a user created collection of questions. The profileId for a user profile is their userId and for user created profiles it is a system-generated unique identifier.

The term "questionId" is intended to refer to an identifier associated with a question that is unique.

The terms "interaction" and "question interaction" are intended to refer to a user performed action with respect to a question such as "responded"—the user submitted a response to a question; "liked"—the user thinks the question is interesting and would like to see similar questions; "watching"—the user would like to be updated on responses and interaction with question, "shared"—the user has sent a notification to other users about the question; etc.

The term "interactionId" is intended to refer to an identifier that specifies a specific interaction, for example watching, shared, liked, or responded and includes "created"—the user created the question.

The term "target user" or "target" are intended to be synonymous and refers to a user, other than the current user, of the system.

The term "response" means the collection of data associated with a user submitting choice selections or numeric input to a question.

The term "respondent" is used to refer to a user, other than the current user, who has responded to a question or to one or more questions that are part of a collection of questions.

The term "respondents" is intended to mean the group of users, other than the current user, who have responded to a question or one or more questions in a collection.

The term "choices" refers to the 0 . . . n list, for example, the list 3, 6, 7, 8 would be a 0 . . . 3 list represented as ["3", "6", "7", "8"] and the list red, yellow, green would be a 0 . . . 2 list represented as ["red", "yellow", "green"], that a user defines to be presented for selection as responses to a question, or the system-generated list of 0 . . . n choices associated with numeric question responses that are used for displaying question results.

The term "selections" means one or more items selected from the available question choices that were user defined or system-generated and associated with synthesized numeric input.

The term "unresponded question" means a question that the current user has not responded to and "responded question" means a question that the current user has responded to.

The terms "collection" or "collection of questions" are intended to be synonymous and mean a list of unresponded and responded questions that are associated with a user, a user created list of questions, or a system derived set of questions.

The term "collectionId" is intended to refer to an identifier that is used to signal the query to be used to return a subset of questions in a collection.

The terms "measure of similarity" and "MOS" are intended to be synonymous and mean the comparison of a user's responses to a question or collection of questions to those of a target user or respondents, or the comparison of a user's question interactions to those of a target user or respondents to a collection. The table in FIG. 17 provides a list of definitions of MOS used herein.

The term "view" means display of a collection of questions and displays of information that informs the user about the profile associated with a collection of questions, the owner of the profile 135 associated with the collection of questions, displays of MOS about the user, profile owner and respondents, displays of user and target interactions with a collection of questions and enables user interactions with the displayed information.

Referring now to FIG. 1, an embodiment of the invention provides a system for users to create a variety of types of questions, respond to and interact with questions, and view MOS to each other based on responses to and interactions with questions and collections of questions comprising a computer or mobile device 100, that communicates with the internet 108 executing an embodiment of client application software 104, either natively on the device 100 or via a web browser 102, communicating via the internet 108 to authenticate users with an authentication and access management service 101 and exchange data related to a client application software 104 with a system application software 110 running on an application server 114 that communicates via the internet 108 and authenticates communication requests with an authentication and access management service 101 and communicates via a network 116 with a data repository 118 to store, retrieve and manage data.

The embodiment of a client application software 104 further contains logic to interact with the system application software 110 to facilitate the methods and interaction of the inventive systems described herein, authenticate the current user for access to the client application software 104, manage user input, navigation of question response results and interactions and manage navigation and display of collections of questions.

A further embodiment of the invention provides a system for storing, retrieving and querying data associated with questions, responses, users, user interactions with questions and question interactions by users comprising an application server 114 system running system application software 110, discussed herein, communicating with a data repository 118 using a network medium 116, communicating to exchange data related to the client software application 104 via the internet 108, communicating with an authentication and access management service 101 via the internet 108 to authorize access for requests from the embodiment of a client application software 104.

The embodiment of a system application software 110 further contains logic to validate access tokens received with requests from an embodiment of a client application software 104 with an authentication and access management service 101 and make the userId associated with the user of the client application software 104 universally available to the system application software 110. The system application software also contains logic that, at the user's first use, creates and stores a profile, discussed herein, for the user and retrieves and initiates a view display 320 (FIG. 11) for a profile associated with the systemId and an associated collection of questions that represents the list of recently created questions.

Figure 2:
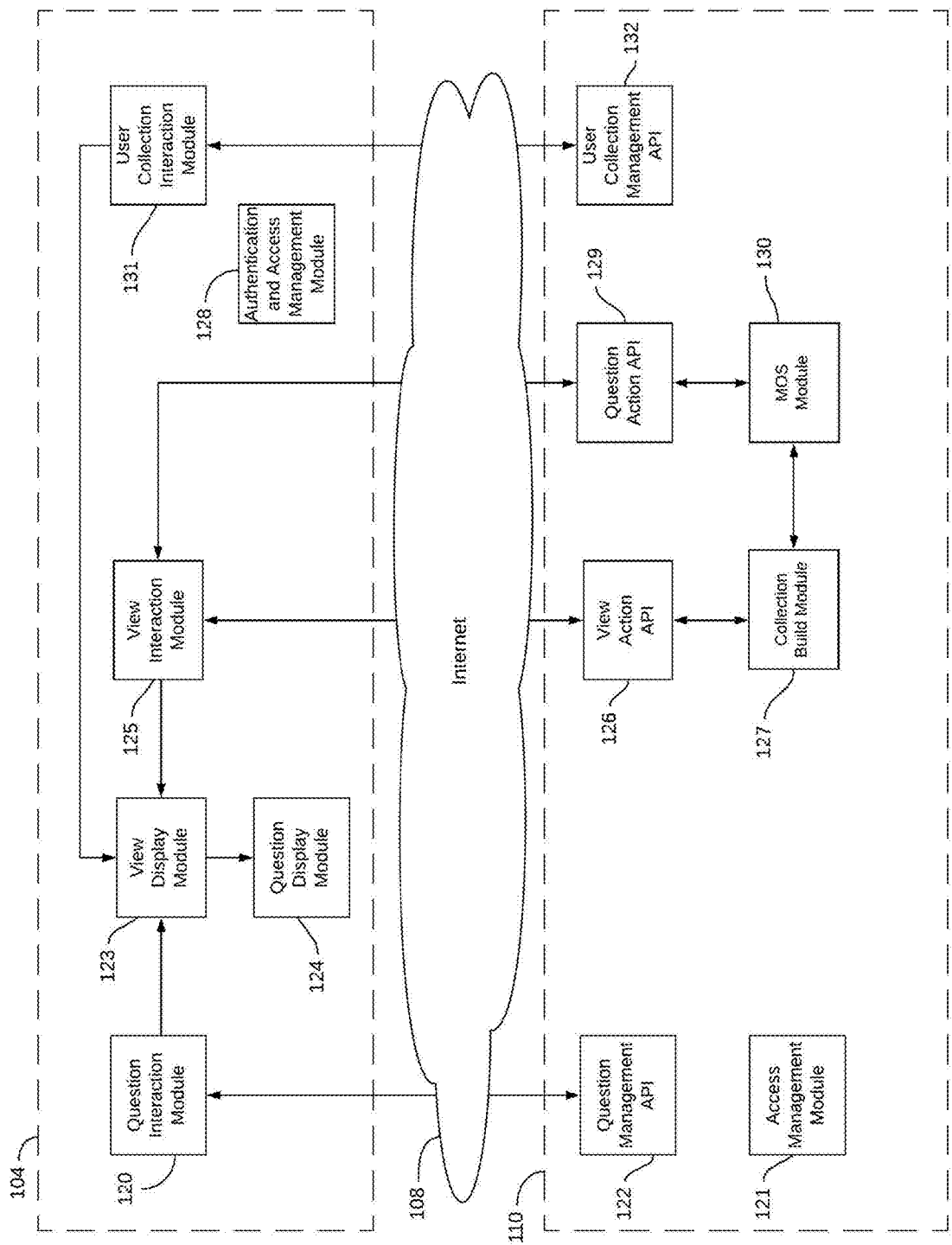
FIG. 2. is a functional block diagram of an embodiment of the distributed client application software and system application software of the present invention.

FIG. 2 represents a functional block diagram that provides a high-level description of a method of the invention and system associated therewith. The authentication and access management module 128 of an embodiment of client application software 104 authenticates users and controls access to the embodiment of client software application 104, discussed herein, and additionally provides authentication tokens for use by an embodiment of a client application software 104 when making requests to an embodiment of a system application software 110. The access management module 121 of an embodiment of a system application software 110 retrieves authentication tokens from all requests originating from an embodiment of client application software 104, validates the authenticity of the token with the authentication and access service 101 and retrieves the userId of the user associated with the token and makes it available to an embodiment of a system application software 110.

In order for question definitions 136 (FIG. 3) to be created, stored, retrieved and interacted with in a way that scales to millions of questions requires that all types of questions be stored in a consistent manner and that all interactions with them are updated, and more importantly, retrieved in a scalable and responsive manner. To achieve this, one of the inventive methods of the present invention is to standardize the data required to define questions, question responses and question interactions into a question management architecture that provides a consistent and scalable approach to presenting large numbers of questions and associated details for response, results viewing and interaction. The approach taken to implement the data architecture is to de-normalize components of the data architecture by creating summary tables to support rapid retrieval of volumes of summary data, for example, the total numbers of times an individual question choice was selected or the total number of times a question has been interacted with, and additionally duplicating data to eliminate repetitive queries required to perform comparisons of lists, for example, comparing a user's response choice selections to the totals for all question choice selections or comparing a user's question choice selections to a target users choice selections. Optionally, the question data architecture could be implemented using a normalized database with each type of question having a custom data definition and using views or queries to realize the data summaries and comparisons, however, user experience would be impacted as the question database grows to hundreds of terabytes and the number of users grows into the millions.

To standardize data used to define a question, the inventive architectural approach is to synthesize user input choices associated with a question into a 0 . . . n list in order to reduce complexity of storage, retrieval, and querying and to facilitate consistent synthesis of MOS across a variety of question definitions. For example, the choices apple, orange, banana and grape would be represented as a 0 . . . 3 list of ["apple", "orange", "banana", "grape"] and true, false would be a 0 . . . 1 list of ["true", "false"]. If the question being created is based purely on user defined choices, then synthesizing a question definition is straightforward in that the selection choices are the user provided list of enumerated choices. The same applies for questions where the user is required to select a rating since they are represented by ordered lists, such as on a Likert scale ["worst", "not good", "ok", "good", "best"], ratings ["☺ ☺ ☺ ☺ ☺", "☻ ☻ ☺ ☺ ☺", "☻ ☻ ☻ ☺ ☺", "☻ ☻ ☻ ☻ ☺", "☻ ☻ ☻ ☻ ☻"], or numeric and linear, for example "on a scale of 1 to 10 how would you . . ." would be ["1", "2", "3", "4", "5", "6", "7", "8", "9", "10"].

Synthesizing questions that expect discrete numeric responses are not as straightforward since the type and range of input can vary greatly. For example, if you wanted to know when the first time was that someone drove a car or truck you could ask "In what year did you first attempt to drive a car or truck?" The range of user responses could potentially be 100 years. It gets even messier if you ask the question "What time of the day were you born?". If you constrain user input to accuracy of 1 minute there still could potentially be 1440 distinct user responses. The same problem presents itself with numbers if you ask "How many steps did you walk today?" The input could range from 0 to 30,000 or more. This type of variability makes it difficult to consistently derive and convey measures of similarity when there are potentially millions of users asking millions of questions. To overcome this variability, and to compute and convey similarity at scale and to provide a consistent user experience, the user input value is captured and synthesized into buckets associated with the numeric range. In the case of the previous examples, the first year driven could be synthesized into 10 buckets representing decades ["1920-29", "1930-39"; "1940-49"; "1950-59"; "1960-69"; "1970-79"; "1980-89"; "1990-99"; "2000-2009"; "2010-2019"], the times of birth could be synthesized into 8 three hour buckets ["00:00-02:59", "03:00-05:59", "06:00-08:59", "09:00-11:59", "12:00-14:59", "15:00-17:59", "18:00-02:59", "21:00-23:59"], the number of steps could be synthesized into 10 buckets of 3000 step increments ["0-2, 999", "3000-5999", "6000-8999", "9000-11999, "12000-14999", "15000-17999", "18000-20999", "21000-23999", "24000-26999"", "27000-29999"]. Once this is done the question definition will meet the requirement that user choices map to a 0 . . . n list of choices. Optionally, the question responses could be captured as direct user input and stored as numeric data in a relational database architecture based on distinct question definitions associated with different types of questions. However, the computation of user similarity becomes more difficult and, more importantly, it becomes more difficult to consistently convey similarity to the average human. Initially knowing how many people were born the same time of day as you, based on buckets of ranges, will satisfy a level of curiosity about similarity. Being able to select and view the list of people who fell into the same bucket as you and view the similarity between you and them within the bucket range, and discussed herein, provides a consistent approach to viewing similarity across a variety of types of questions.

Figure 3:
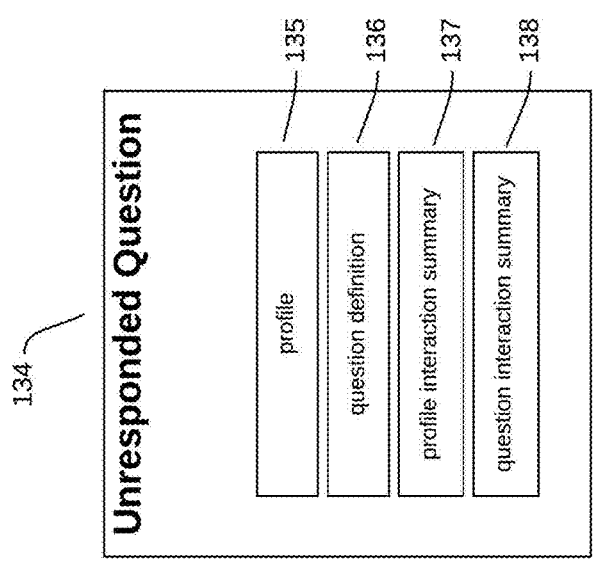
FIG. 3. is a block diagram of an embodiment of an unresponded question illustrating the integration of architecture components.

The architectural preference of synthesizing question choices into a 0 . . . n list, versus having question definitions vary by question type, coupled with de-normalization of summary data and duplication of response data, facilities a question management architecture that enables the responsive viewing and interaction with summary data associated with questions and the computation of MOS. Optionally, the question management architecture could be implemented using normalized database approach that would rely on queries and views to derive summary data. At the core of the question management architecture are the unresponded and responded question. FIG. 3 provides a block diagram of an embodiment of an unresponded question 134 that in some embodiments of the present invention comprises:

a profile 135, that comprises a profileId, userId, name that is the user's name for a user and a descriptive name for a user created profile, description, a count of user created profiles associated with the profile, a hypertext link to an image file and hypertext links to social media and web sites associated with the profile;

a question definition 136 that comprises a question identifier, a user identifier, a 0 . . . n list of user defined response choices, the minimum required and maximum allowed number of choices that can be selected and the type of question that the question definition represents (user choices, rating, date, time, number, etc.), in other embodiments, the question definition of the present invention comprises a questionId, a userId, a 0 . . . n list of user defined response choices, the type of question the definition represents, numeric values that represent the minimum and maximum allowable numeric input value and the number of buckets the user input will be synthesized into for response display and MOS computation, in further embodiments, a question definition 136 of the present invention comprises a questionId, a userId, a 0 . . . n list of user defined response choices, the minimum required and maximum allowed number of choices that can be selected, the type of question that the question definition represents, a hyperlink to a multimedia file associated with the question text and/or a 0 . . . n list of hyperlinks to multimedia files associated with the question choices;

a profile interaction summary 137, that in some embodiments of the present invention comprises: a profileId; question identifier; boolean values and associated timestamps that indicate whether or not the user created the question, responded to the question and also indicating any other interactions the user has had with the question, in other embodiments of the present invention a profile interaction summary comprises: a profileId; question identifier; boolean values and associated timestamps that indicate whether or not the user created the question, responded to the question, or any other interactions the user has had with the question; a 0 . . . n list of user selected choice values, in the order they were selected, associated with their response; and a user weight that comprises a number that represents any adjustment, up or down from 1.0, to the importance of this question when computing similarities across collections of questions;

a question interaction summary 138, that comprises: a questionId; a userId; and integer numbers associated with interactions and representing the number of times users have the associated interaction with the question.

Figure 4:
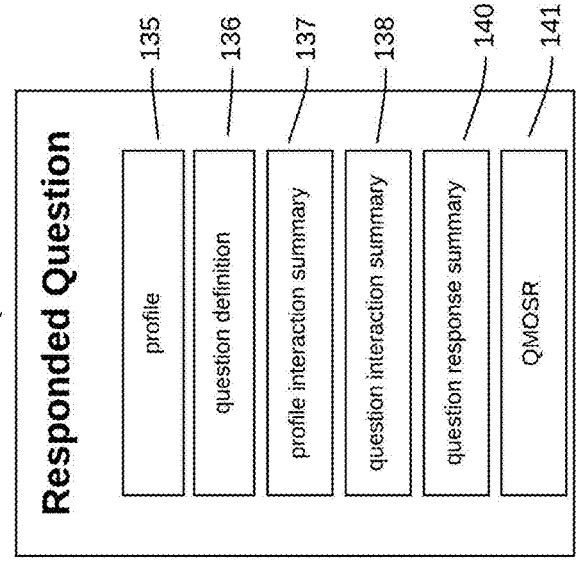
FIG. 4. is a block diagram of an embodiment of a responded question illustrating the integration of architecture components.

FIG. 4 provides a block diagram of an embodiment of a responded question 139 that in some embodiments of the present invention comprises: a profile 135 of the question creator; a question definition 136; a profile interaction summary 137; a question interaction summary 138; a question response summary 140 that comprises: a questionId; a 0 . . . n list of integers used to count the number of times a question choice was selected by a user; a 0 . . . n list of numbers used to track the average of the discrete user responses for numeric data; a number that represents a QMOSR for the user viewing the question, a number indicating the choice order of the question response summary in other embodiments of the present invention a responded question comprises: a profile 135 of the question creator; a question definition 136; a profile interaction summary 137; a question interaction summary 138; 0 . . . n question response summaries 140 used to track the order of choice selections for questions where choice order matters, a 0 . . . n list of numbers used to track the average of the discrete user responses for numeric data; a number that represents a QMOSR for the user viewing the question. For example, if a question has five choices and the user is required to choose three in order, the question response summary 140 data would consist of three records with a list of 0 . . . 4 numbers to count responses and an associated choice order number of 0, 1 or 2 to indicate in which order the user choices were chosen. If order is not important then the question response summary 140 data would be captured in a single record.

Synthesizing question choice selections into a 0 . . . n list as part of the question definition 136 enables user responses to be synthesized into a 0 . . . n list of choice selections. This enables a consistent question response, that in some embodiments of the present invention comprises a questionId, a userId and a 0 . . . n list of question choice selections, in other embodiments, a question response of the present invention comprises a questionId, a userId, a 0 . . . n list of question choice selections that numeric responses are synthesized into and a 0 . . . n list of numeric values representing the users numeric input. This approach also facilitates the inventive method of synthesizing measures of similarity (MOS) for a variety of types of questions, collections of questions and user interactions with collections of questions.

By synthesizing question choices to a 0 . . . n list, and denormalization of the data relationships by introducing summary and, in the case of question responses, partial duplication, the invention results in a repeatable method of computing measures of similarity across a large database of questions for large numbers of users in a responsive manner. The table in FIG. 17 provides a listing of embodiments of measures of similarity (MOS), that are numeric representations of similarity, discussed herein, and comprises:

question measure of similarity versus a target QMOST 700 that is computed using the user and target's 0 . . . n choice selections from their profile interaction summaries 137 associated with a question;

collection measure of similarity versus respondents CMOST 702 that is computed using the user and target's 0 . . . n choice selections from their profile interaction summaries 137 associated with a question and a computed Weight 716 for the questions in a collection;

question measure of similarity versus respondents QMOSR 706 that is computed using the 0 . . . n choice counts from the question response summary 140, 0 . . . n choice selections from the user's profile interaction summaries 137 and a computed Weight 716 for the questions in a collection;

collection measure of similarity versus a target CMOSR 708 that is computed using the 0 . . . n choice counts from the question response summaries 140, the 0 . . . n choice selections from the user's profile interaction summaries 137 and a computed Weight 716 for the questions in a collection;

question interaction similarity QIS 712 that is computed using the user and targets profile interaction summaries 137 associated with a question; and collection interaction similarity CIS 714 that is computed using the user and targets profile interact summaries 137 associated with a collection of questions.

In other embodiments measures of similarity of the present invention comprises computations based on question response summaries, question interaction summaries, profile interaction summaries, Weight 712, date and time of question responses, frequency of question responses, date and time of question interactions and frequency of question interactions, in further embodiments, measure of similarity of the present invention comprises computations based on question response summaries, question interaction summaries, profile interaction summaries, Weight 712, analysis of the text associated with questions and response choices and the analysis of images or media associated with a question. Optionally, measures of similarity could be computed without differentiating the number of choices, order of choices and complexity of the questions and could be based on a simple count of questions that were responded to in common, with or without weight for collections of questions.

Figure 5:
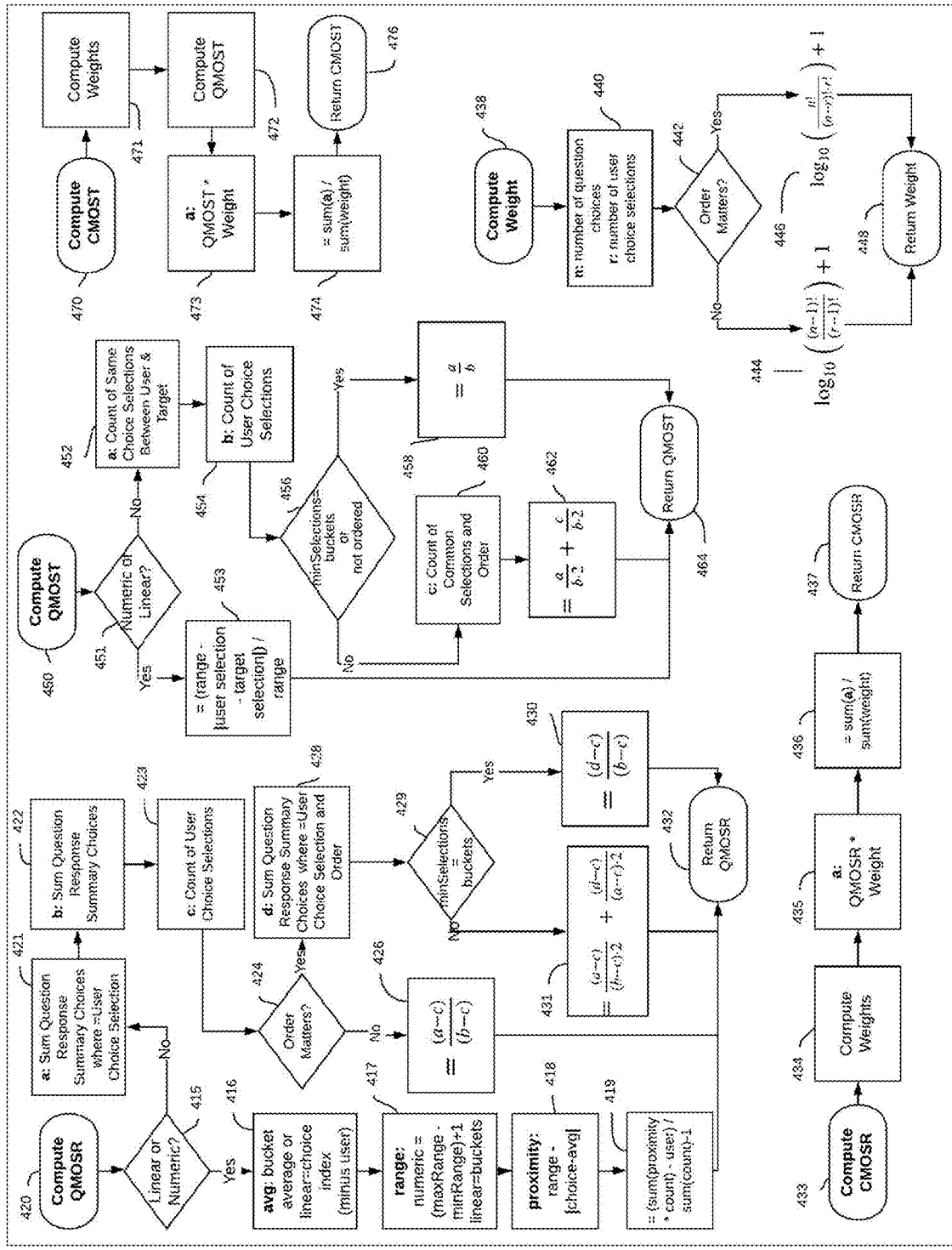
FIG. 5. is a flowchart of an embodiment of a measure of similarity (MOS) module used to synthesize similarity based on question responses, interactions and complexity.

Referring now to FIG. 5, the MOS module 130 of an embodiment of client application software 104 provides functions that compute the core measures of similarity between the user and respondents to a question or collection of questions and the user and a target user of the collection of questions and includes QMOST 700, CMOST 702, QMOSR 706, CMOSR 708 and Weight 716.

The compute QMOST 700 function 450 of the MOS module 130 preferably considers the ratio of a user's responses in common with a target to the total number of user responses, for example if Sally selected 3 choices for response to a question and Jane selected 2 choices and they matched two of Sally's, from Janes's viewpoint she and Sally are 100% similar but from Sally's view point they are 67% similar. The QMOST 700 function is passed the question selection choice lists from the profile interaction summaries 137 for the user and a target user, the minimum number of selections, number of buckets, range minimum and maximum values, whether or not the question type is numeric, linear or selections, and whether or not order matters from the question definition 136, if the question type is numeric or linear 451 it computes similarity as the difference between the range, which is range maximum–range minimum+1 for numeric or number of buckets for linear, minus the absolute value of the difference between the user and target choice selections, divided by the range 453. If the question type is not numeric or linear, it counts similar choices made by the user and target 452, gets the count of the user selection choices 454, and if order does not matter or the minimum number of selections is equal to the number of buckets 456 computes similarity as the ratio of similar choices between the user and the target to the user's total number of choices 458, otherwise, it computes the number of similar choices and order between the users 460 and computes similarity 462 based 50% on the ratio of similar choices to the user's total number of choices 458, and 50% on the ratio of similar choices and choice order, determined by the index in the 0 . . . n selection list, to the user's total number of choices 462. Optionally, the compute QMOST function could return the ratio of the number of choices the user has in common with the target irrespective of order or, it could be computed based on the user's choice selection placement, in the order of the choice selections, versus the target. The computed similarity is returned 464 to the caller.

The compute QMOSR 706 function 420 of the MOS module 130 preferably differentiates similarity based on user choices that are the same as the respondents choices and take into account whether or not order of choices matters and is passed the question selection choice list from the user profile interaction summary 137, the question response summaries 140 associated with the question, the minimum required selections, number of buckets, range minimum and maximum values, and whether or not order matters from the question definition 136, if the question type is linear or numeric 415, then, if the question is numeric it modifies the question response summary by recalculating the average associated with the user's choice selection by removing the user's actual response from the current average for the choice matching the users choice selection, and decrements the choiceCount of the choice matching the user's choice selection, uses avg=the bucket average for numeric or the user's choice selection for linear questions, uses range=number of buckets for linear questions or (maxRange−minRange)+1 for numeric 417, computes proximity=the difference between the range and the absolute value of the difference between the users actual response for numeric questions and choice selection for linear and avg 418, and sums the product of proximity and choiceCount for each non-zero choiceCount of the modified question response summary 419, and divides this by the sum of choiceCounts. If the question type is not linear or numeric it sums the number of selection choices the user has in common with the respondents 421, sums the number of choice selections 422, gets the count of the user selection choices 423, and if order does not matter 424 returns the ratio of respondents' choices that match the users and all choice selections made by respondents 426. If order matters then it sums the count of choice selections where the user order is the same as respondents' order 428, and if the minimum required selections is equal to the number of buckets 429, the QMOSR is computed with 50% of it attributed to common selection choice between the user and respondents and 50% is attributed to the count of similar order of choice selections between the user and respondents 431, if the minimum required selections in less than the number of buckets 429 then QMOSR is computed as the ration of respondents' choices that match the users and all choice selections by respondents 430. Optionally, the QMOSR 706 function could return the ratio of the number of choices the user has in common with other users irrespective of order or, it could be computed based on the user's choice selection placement in the order of the choice selections. Once the QMOSR is computed it is returned to the caller 432.

The compute Weight 716 function 438 of the MOS module 130 preferably distinguishes questions based on the choice complexity and whether or not order of choices matters and is passed the number of buckets associated with a question definition 136 and the number of choice selections made by a user 440, and if order matters 442 it computes the logarithm, base 10, of the number of combinations where order matters and adds 1 to prevent a 0 Weight 446 and if order does not matter it computes Weight based the logarithm, base 10, of a modification of combinations where order doesn't matter and adds 1 to prevent a 0 Weight 444 and returns the Weight to the caller 448. Optionally, Weight could be based on the ratio of the number of user choices versus the number of respondents' choices, irrespective of Weight, could be a assigned based on the type of question, question text, associated images or media, time the question was created, time between the user's responses, etc. or it could be a manually assigned number used to differentiate the questions.

The compute CMOSR 708 function 433 of the MOS module 130 preferably distinguishes questions based on the choice complexity and whether or not order of choices matters and is passed a list of QMOSR 141 (FIG. 5) associated with responded questions 139 in a collection, the number of choices selections made by the user for each question, number of buckets and whether or not order matters from the question definition 136 associated with each question, computes Weight for each question 434, calculates the sum of the product 434 of the QMOSR 420 and Weight 438 for each question in the list and computes similarity as the weighted average of the products 436. Optionally, the CMOSR can be computed without any regard to weighting of the questions. The computed similarity is returned as the CMOSR 420, along with the number of questions used to compute it, to the caller 437.

The compute CMOST 702 function 470 of the MOS module 130 is passed a list of the minimum required selections, the range of allowable choices, number of buckets and whether or not order matters from the question definition 136 associated with user responded questions, and the user's and target's 0 . . . n selection choice lists from their associated profile interaction summaries 137 associated with each question, calls the compute Weight function 438 to compute the Weight for each question 471, calls the compute QMOST function 450 to compute the QMOST 472 for each question, calculates the product 473 of the QMOSTs 450 and Weights 438 for each question the user and target both responded to (number of choice selections greater than 0) in the list 473 and computes similarity as the average of the weighted products 474. Optionally, the CMOSR can be computed without any regard to weighting of the questions. The computed similarity is returned as the CMOST 702, along with the number of questions user to compute it, to the caller 476.

The inventive methods of the question management architecture, based on synthesizing question response choices into 0 . . . n choice results as part of the question definition 136, associating the question definition with a profile 135, de-normalization of the data architecture and extending the 0 . . . n choice approach to the profile interaction summary 137 to couple user choice selections with user question interactions, summarizing the 0 . . . n user choice selections as a question response summary 137 and summarizing the user interactions with questions into the question interaction summary 138, enables the inventive methods of computation of measures of similarity across a variety of types of questions and computation of weight, based on question complexity when computing measurement of similarity for a collection of questions.

Additionally, the question definition architecture enables the inventive systems that facilitate the navigation of a large database of questions by large numbers of users such as:

by profile: questions can be retrieved and displayed based on association with a user profile 135 or user created profile for a collection of questions based on the question definition 135; any time a profile is displayed as part of a question or in a listing of profiles it can be used to initiate a view of all questions associated with profile, by question responses: the total numbers of users who responded to a question with a given choice selection can be retrieved and displayed based on the question response summary 140 and the details of the users who made the selections can be retrieved and displayed, along with a QMOST 700 display, based on the question responses and profile interaction summaries 138 and associated profiles 135 for the users, by question interactions: the profile interaction summary 137 enables the display of a user's interactions with a question; the question interaction summary 138 facilitates display of the count of the number of times a question has had a given interaction and the details of the users who had the interactions can be displayed, along with a display of QIS 712-based on the profile interaction summaries 137 and associated profiles 135, by measures of similarity: a QMOSR 706, associated with a responded question 139 can be displayed and used to trigger a display of the associated users' profiles and a QMOST 700 display based on profile interaction summaries 138; a CMOST 702 display can be used to trigger a display of responded questions 139 used to generate the CMOST 702 display based on profile interaction summaries; a CMOSR 708 display can be used to trigger a display of responded questions 139 used to generate the CMOSR 708 display based on profile interaction summaries; a CIS 714 display of counts of common interactions in a collection, with the owner of the collection, can be used to trigger a display of questions associated with interactions based on profile interaction summaries by collections: the display of collection count associated with a profile 135 can be used to trigger a view profile collections action 623 (FIG. 15) to display collections associated with the profile 135; the display of the count of collection interactions for questions can be used to trigger a view question memberOf action 619 (FIG. 15) to display the collection profiles 135 that the question has been added to, by question interaction summaries: displays of user and target user collection interaction summary counts can be used to trigger the display of the collection of questions that the interaction counts were based on using the profile interaction summaries 137.

The following discussion of FIGS. 6 through 15 will detail how the inventive methods are orchestrated across the systems of the invention to fill the gaps identified in the current art.

Figure 6:
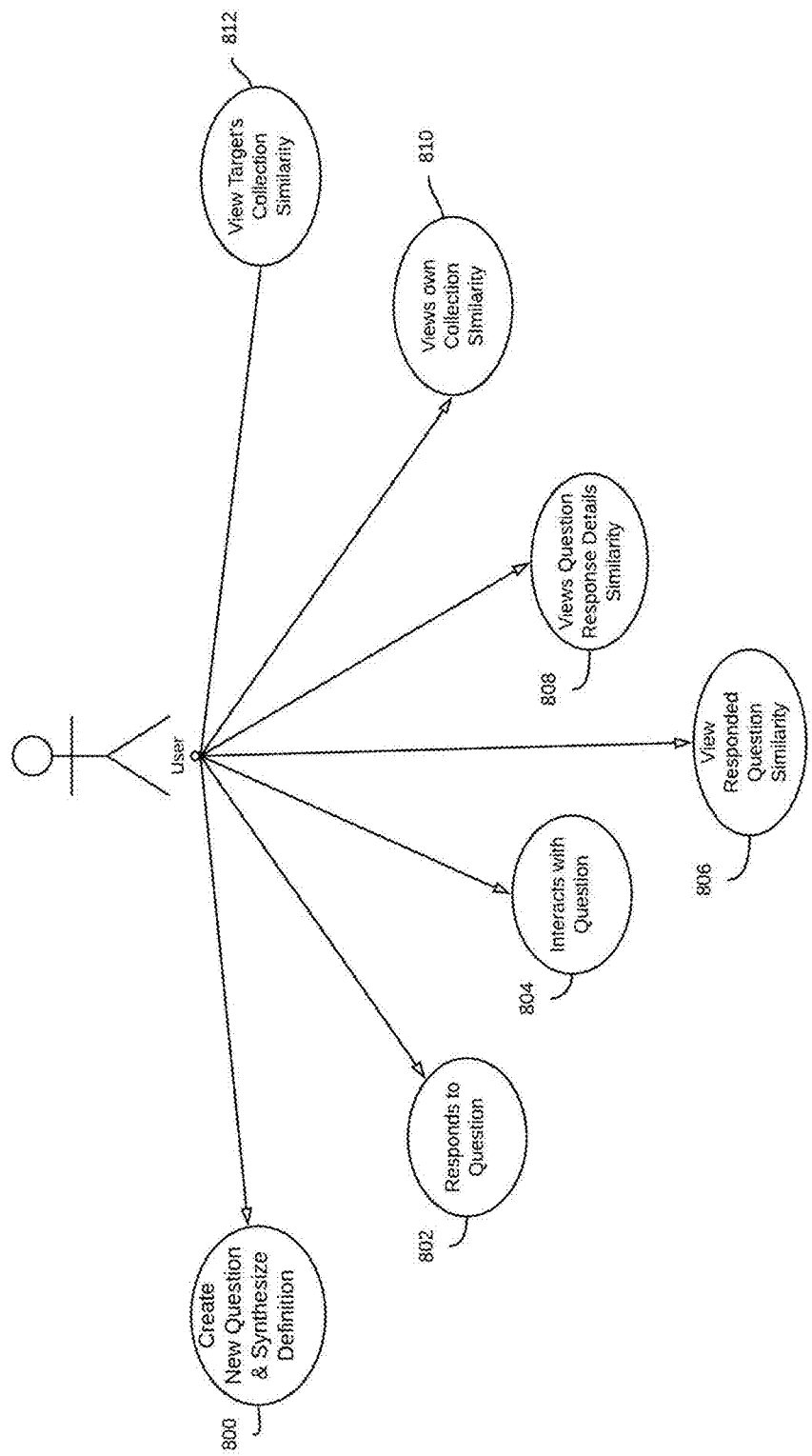
FIG. 6. use case diagram for walkthrough of inventive methods of synthesizing questions into consistent framework, computing similarity, and differentiating questions based on complexity.

FIG. 6 provides example use cases that will be walked through to illustrate the inventive method of synthesis of question definitions when users create questions 800, the question management architecture when responding to 802 and interacting with 804 questions, viewing responded questions 139 and QMOSR 706, and computation of CMOSR 706 and CMOST 702, viewing question response details 808 and computation of QMOST 700 and QIS 712, viewing a non-target user's view 810 and computation of CMOSR 708, CIS 714, and viewing a target user's view 812 and computation of CMOST 712, CIS 714. Modules associated with the actions described in the use cases are defined and documented herein and will be referenced and synopsized for the purpose of providing a brief walkthrough of the core inventive methods of the present invention. The walkthrough is based on five users, "userA, userB, userC, userD, and userE with userIds "a,", "b", "c", "d", and "e" respectively.

Figure 7:
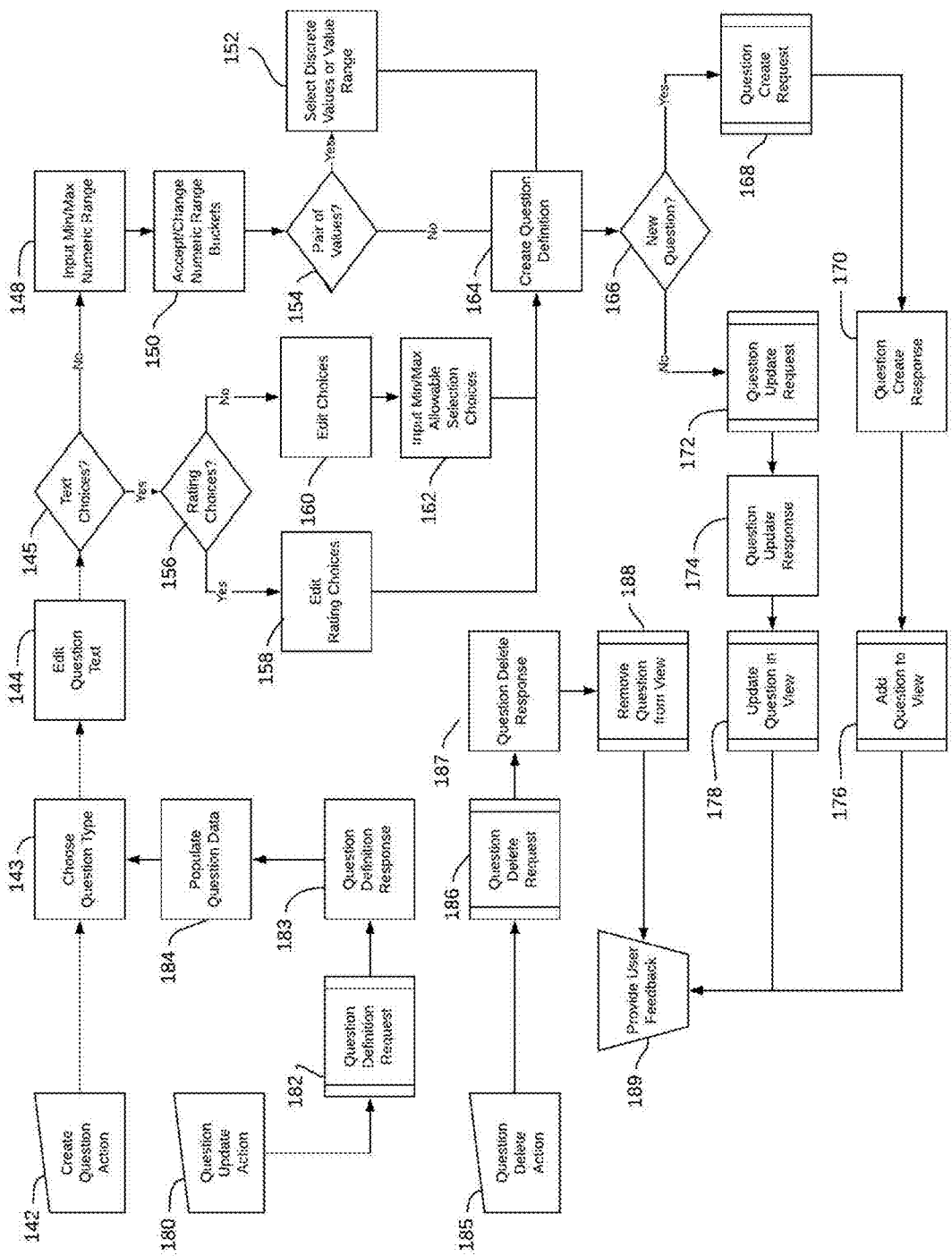
FIG. 7. is a flowchart of an embodiment of a question interaction module of a client application software that is used to interact with users to initiate question creation, synthesis into a consistent question definition, update and deletion.

Creating a new question 800 and associated synthesized question definition 136 begins when the user initiates a create question action 142 (FIG. 7). When user "a" initiates a create question action 142, she is prompted to choose a question type 143 and she chooses a "selection" question, next she is prompted for and enters the question text 144 "Are you a morning, afternoon, evening or night person?", she selects texts choices 145, no for rating choices 160, and she edits the choices 160 by entering "morning", "afternoon", "evening" and "night" for the choices which is a 0 . . . n list and obviates the requirement for synthesis, updates the number of buckets to match the length of the list, in this case 4, and since she wants the users to be able to select a single choice she sets the min required selections and the max allowed selections 162 to 1, the question definition is created 164 from the inputs and since it is a new question 166, it is passed to the question management API 122 of an embodiment of system application software 110 as a create question request 190 (FIG. 8), the user profile is retrieved based on the userId associated with the access token that was submitted as part of the create question request 190, a questionId is generated, for this example it is "1", and added to the passed in question definition along with the userId "a" and the question definition is created 199 in the data repository 118, if order matters 200-question response summaries for the number of required ordered choices 203 are created and if order does not matter a single question response summary 201 is created in the data repository 118, a question interaction summary 202 for question "1" and a profile interaction summary 209 for user "a" and question "1" are created in the data repository 118. User "b" elects to create a selection type question, with text "Which of the following fruits do you eat most often?", choices "apples", "oranges", "bananas", "grapes", "pears", "cherries", with min selections 1 and max selections 6, meaning users can select all of them, buckets are assign the value of 6 and the question is submitted and the question definition for question "2" is created 199 along with a question response summary 201, question interaction summary 202 and a profile interaction summary 209. User "c" elects to create an ordered selection type question, with text "How would you rank the following human needs in order of importance?", choices" "relationships", "safety", "well being", "accomplishments" "achieving potential", with min and max selections 5, meaning users have to order all 5, buckets is assign the value of 5, the question is submitted and a question definition for question "3" is created, since order is important 5 question summary records 203 are created to keep track of the choice counts in the order users make them, and question interaction 202 and profile interaction 209 summaries are created. User "d" elects to create a date type question, with text "In what year did you first attempt to drive a car or truck?", with min and max numeric range of 1920 and 2019, accepts the default synthetization into 10 buckets 150 which creates default choices of "1920-1929", "1930-1939"; "1940-1949"; "1950-1959"; "1960-1969"; "1970-1979"; "1980-1989"; "1990-1999"; "2000-2009"; "2010-2019", indicates it is a single input question 154, and the question is submitted and question "4" is created. User "a" elects to create an ordered selection question, with text "What are the first three things you routinely do in the morning and in which order do you do them?", choices "eat something", "smoke", "shower", "make bed", "drink water", "hit snooze", "use bathroom", "social media", "have coffee", "look out window", min and max selections equal to 3, buckets is assigned a value of 10, the question is submitted and a question definition for question "5" is created, since order is important 3 question summary records 203 are created to keep track of the choice counts in the order users make them, and question interaction 202 and profile interaction 209 summaries are created. The table in FIG. 18 provides an embodiment of question definitions, the table in FIG. 19A an embodiment of question response summaries, the table in FIG. 20A an embodiment of question interaction summaries, and the table in FIG. 21A an embodiment of profile interaction summaries that represent key components of the question management architecture that have been populated based on the preceding examples. Users respond to questions 802 by initiating a question response action 346 (FIG. 11) and either choosing from question choices that are presented to them or providing the input required, in the case of numeric responses, and once all inputs have been collected 348, the choices and or input are submitted as a question response request 340 to the question action API (FIG. 12) of an embodiment of system application software 110, a question response 389 is created, the question response summary 390 is updated, the profile interaction summary is updated or created if one does not exist 391, and the question interaction summary is updated 392 to reflect the response, a QMOSR 706 is computed for the question, if it is a target user's collection is being viewed a QMOST 700 is computed 395, to be used by the client to update the CMOST 702, and a question interaction similarity 714 is retrieved 396 and submitted as part of the question response response 397. the table in FIG. 19B is an updated embodiment of question response summaries, the table in FIG. 20B an updated embodiment of question interaction summaries, the table in FIG. 21B an updated embodiment of profile interaction summaries and the table in FIG. 22B is an embodiment of question responses based on the responses and interactions of users "userA, userB, userC, userD, and userE with userIds "a,", "b", "c", "d", and "e" respectively and questions q1, q2, q3, q4, and q5 with questionIds "1", "2", "3", "4", "5" respectively and described in the following paragraphs.

For the purposes of continuing the walkthrough, once the preceding questions have been created, the users are all viewing the current collection of the five preceding questions as part of a view associated with the systemId. The userA selects "morning", choice 0, for q1 "Are you a morning, afternoon, evening or night person?", initiates a question response action 346 (FIG. 11), the response is submitted 350 to the question action API 388 (FIG. 12), a user response is created for q1, user A, a selection of "0", and an order of "0" since it is a single choice selection question, as indicated by the question definition 136 max selections, summarized in the table in FIG. 18, the question response summary for q1 is retrieved and updated 390, the user profile interaction summary is retrieved and updated 391, since it was created when userA created the question, the question interaction summary for q1 is retrieved and updated 392, with all of the updates being posted to the data repository 118. is updated to reflect the. For purposes of the walkthrough, QMOSR 393 and CMOST 395 computation will be addressed as part of a separate use case. The process is repeated with userB selecting and submitting "evening" choice 2, userC selects "morning" choice 0, user "d" does not respond, and user "e" selects "afternoon" choice 1. The same process occurs with q2 "Which of the following fruits do you eat most often?" with the following differences: the question definition 136 for q2 indicates that it allows up to 6 responses to be selected, order does not matter, since userB created q2 a profile interaction summary has already been created, and although order is not important, multiple choice selections are always stored in the order of selection for architectural consistency as reflected in the tables in FIG. 19B, FIG. 21B, and FIG. 22B. The userA proceeds and selects "apples", "oranges", "bananas", and "cherries", userB selects "oranges", "bananas", and "pears", userC does not respond, userD selects "grapes", "pears", and "cherries" and userE selects "apples" and "cherries". All users except userE select responses for q3 "How would you rank the following human needs in order of importance?" with choices ""relationships", "safety", "well being", "accomplishments" "achieving potential" and the process proceeds the same with the following differences: since minSelections and maxSelections are equal to five, each user must select all five in the order of their preference for the required input to be considered valid 348 (FIG. 11) and the question response summary 140 choiceCounts are updated based on user selection order such that if a user selects choice 2 as their first choice then the response summary for the question with order value of 0 and choiceCount[2] incremented. All users' order of selections for q3, except userE who did not respond, are reflected in the table in FIG. 19B, FIG. 20B, FIG. 21B, AND FIG. 22B. For example, userA selected the order of "safety", "accomplishments", "relationships", ""well being", and "achieving potential" which are recorded as the 0 . . . n list "1, 3, 0, 2, 4" in the profile interactions summary 137 and reflected in table in FIG. 21B, updated in the question response summaries 140 with choice "1" incremented in record q3 order 0, choice "3" incremented in q3 order 1, etc. and reflected in FIG. 19B, and the individual choice selections are recorded in order of selection as reflected in the table in FIG. 22B. All users respond to q4 "In what year did you first attempt to drive a car or truck?", which requires numeric input in the form of a date within the range of 1920 to 2019 inclusive, defined in the question definition 136 for q4 and reflected in the table in FIG. 18. The user input is hashed, or sorted, into a choice selection by subtracting the rangeMin, defined as part of the question definition 136 for q4, from the users input and taking the quotient of the result divided by the number of buckets, defined as part of the question definition 136 for q4. The userA inputs "1997" which hashes to choice 7 "1990-1999" and since it is the first response the average for bucket 7 is set to 1997, userB "1955" which hashes to choice 3 "1950-1959" with average 1955, userC responds with "1990", bucket 7, and since this is the second choice the choice count for bucket 7 is 2 and the average is set to 1995. The question response request 388 (FIG. 12) flow is followed for numeric input with the difference that, for numeric input, the actual value entered is stored as part of the question response, as reflected in the table in FIG. 22B for q4 for all five users. All five users respond to q5 "What are the first three things you routinely do in the morning and in which order do you do them?" with the difference from q3 being that the maxSelections is less that the number of buckets, as defined in the question definition 136 and reflected in FIG. 18.

Users interact with questions 804 by initiated question interaction actions 336 (FIG. 11) to "watch", "share" and "like" the questions, as indicated in the table in FIG. 21B, required input of user names and/or emails have been supplied by the users for "share" interactions 338, question interaction requests 340 were submitted to the question action API 129 of an embodiment of system application software 110, the question interaction request 380 (FIG. 12) is processed, if it is not a toggle on/off only, such as with "watch" and "like", then required action is performed 382, which in the case of share, is the processing of emails and user notifications, a profile interaction summary is created or updated 383, and the question interaction summary is updated 384. For purposes of this walkthrough, computation of QMOSR 393 and QMOST 395 will be discussed separately and the tables in FIGS. 20B and 21B reflect each of the users' interactions with each of the questions.

Users view responded questions similarity 806 either as a result of initiating a question response 346 (FIG. 11) or because a question that they had previously responded to is retrieved as part of a collection that is retrieved as the result of a view action 320 (FIG. 11) or a collection view action 328, both discussed in detail herein. In the case of creating a new question response 388 (FIG. 12) the required question definition 136, profile interaction summary 137, question response summaries 140 are retrieved 389 or created, as required, in the case of the profile interaction summary 391, and used as input to the compute QMOSR function 420 of the MOS module. For example, if userC was the last respondent to q1 "Are you a morning, afternoon, evening or night person?" with the choice selection of "morning" (0), the question response summary reflected in the table in FIG. 19B, the user's profile interaction summary reflected in the table in FIG. 21B, the question definition reflected in the table in FIG. 18 would be used as input to the compute QMOSR function 420 (FIG. 5) and QMOSR 706 is computed as follows: a=2 because two users selected choice 0, which was userC's choice 421 based on the question response summary (FIG. 19B); b=4, the sum of all question choice selections 422 based on the question response summary (FIG. 19B); c=1, count of the user's selections 423 based on the profile interaction summary (FIG. 21B); order does not matter 426; QMOSR=(2−1)/(4−1)=0.33 which based on the definition of QMOSR 706 means 33.3% of the respondents' choice selections are the same as userC's. The compute QMOSR function 420 returns the computed QMOSR 706 to the caller 432.

If userC wanted to view similarity with the users who responded to q1 with a choice selection of "morning" 808 (FIG. 6), she would initiate a view response details action 364 (FIG. 11) that would ultimately result in a display of a user list with MOS 362 that includes a display of QMOST 700 and QIS 712 between userC and other respondents who selected "morning", which in this example is userA, as reflected in the table in FIG. 18. The view interaction details request 366 passes the question id "q1" and the choice selection "0" to the to the question action api 129 of an embodiment of a system application software 110, the question response details request 398 (FIG. 12) retrieves the userIds for users who selected choice-choice of "0" for q1 399, retrieves the profile interaction summaries and profiles, for the user, userC, and the target, userA 400 from the data repository 118, computes a QIS 712 list 402 by comparing the question interactions, based on the profile interaction summaries 137 for userC and userA, depicted in the table in FIG. 21B, and produces a list of interaction similarities, for example 0 means neither have had the interaction, 1 means only the user had the interaction, 2 means only the target had the interaction, and 3 means both user and target have had the interaction, as follows: "watching:3" both are watching, "shared:1" userA has shared, "liked:2" userC has liked, and passes the profile interaction summaries, the minimum number of selections, number of buckets, and whether or not order matters from the question definition 136 to the QMOST function 403 that computes QMOST 450 (FIG. 5) as follows: a=1 because, based on comparison of the profile interaction summaries 137 for userC and userA for q1, and depicted the table in FIG. 21B, they have one choice selection for q1 in common 452; b=1 since the profile interaction summary for userC indicates that the user made a single choice selection 454; based on the question definition for q1, FIG. 18, the minimum selections does not equal the buckets and the question is not ordered 456, QMOST=a/b which in this case is 1/1 or 100%, which based on the definition of QMOST 700 (FIG. 17) means 100% of userA's choice selections are the same as userC's.

The user views collection similarity 810 (FIG. 6) associated with a collection of questions by initiating a view display action 320 (FIG. 11) or a collection view action 328, discussed herein and summarized for the purposes of this walkthrough, that trigger calls to the view action API 126 (FIG. 2) of an embodiment of system application software 110, are processed as view requests 502 (FIG. 13) and collection view requests 512 respectively, retrieve respective lists of questionIds and userIds for the view request 506 and collection view request 514 respectively and pass the retrieved lists 508 to the build collection of questions function 538 of the collection build module 127 (FIG. 2), that retrieves 542 the profiles 135 (FIG. 3) for the user and userIds associated with the provided that was passed to the function, retrieves 544 the question definitions 136, 546 the user and target profile interactions summaries 140, retrieves 548 the question interaction summaries 138, and retrieves 550 the question response summaries 140 associated with the provided list of questions and userIds and proceed through the process until a collection view 578 is built and returned to the caller. CMOSR is computed 566 by the compute CMOSR function 433 (FIG. 5) of the MOS module 130 (FIG. 2) and is passed a list of QMOSR 141 (FIG. 5) associated with responded questions, the number of choice selections made by the user for each question, number of buckets and whether or not order matters from the question definition 136 associated with each question. The table in FIG. 23, compiled from the data in FIGS. 18, 19A, 20A, and 21A, and 5b, provides a listing of the questionId, userId, whether or not order matters, number of buckets, user selection count, and QMOSR 706 computed using the compute CMOSR function 420, and Weight 716 computed using the compute Weight 438 function, using the data from FIG. 23. For example, if userA was viewing a collection of questions q1, q2, q3, q4 and q5 retrieved in her default view, her user profile interactions for q1 through q5, as depicted in FIG. 21B and the question definitions for the questions, as depicted in FIG. 18, would provide the input to the compute QMOSR function 443 (FIG. 5) when called by build collection function 538 to compute CMOSR 566. The resulting CMOSR 708 for userA would be: (0.33*1.78+0.63*2.30+ 0.2*5.16+0.83*6.56+0.58*4.64)/(1.78+2.30+5.16+6.56+ 4.64)=54.8%. The CMOSR for userB is 31.9%, userC 51.3%, userD 49.5%, and userE 50.3 and illustrates the variability of similarity based on complexity of questions, user responses and number of questions responded to in a collection.

If the user is viewing the same collection of questions 812 in a target users view 570, the build collection function 538 passes the retrieved user and target users profiles 545, to the compute CMOST function 470, along with the number of buckets and whether or not order matters from the question definition 136, computes the Weights 471, computes the QMOSTs 472, multiplies the QMOSTs by the Weights 473, computes the average 474 and returns the CMOST 476. For example, the CMOST for userA when viewing the collection of q1 through q5 in userB's collection, has the same computed Weights as the previous example and are identified in FIG. 23, the QMOSTs computed by the QMOST function 450 are 0.00 for q1 because they have no selections in common; 0.25 for q2 since they have 1 selection in common 452, userA has 4 choices 454 and it is not an ordered question or minimum selections is not equal to the number of buckets, 1 and 6 respectively for q2; 0.2 for q3 since they have five selections in common 452, userA has 5 selections 454, order matters 456 and minSelection=buckets, and they have 1 selection in common 460; 0.58 for q4 since it is numeric 451, the range is 100 and the absolute value of the distance between user responses, 1955 and 1997 is 58 453; and 0.5 for q5 since it is ordered and common choices 452 a=2, user selections 454 b=3, it is ordered and min selections is not equal to buckets 456 and count of common ordered selections 460 c=1. As a result, the CMOST for userA viewing the collection of userB is (0.20*1.78+0.25*2.30+ 0.20*5.16+0.58*6.56+0.50*4.64)/(1.78+2.30+5.16+6.56+ 4.64)=39.6%. If the CMOST was computed from userB viewing userA's collection of the same questions, the QMOST for question q2 would change to 0.33 since, while they only have one question in common, userB only made three selections so it is ⅓, and the CMOST of userB viewing the collection associated with userA becomes 40%.

Referring now to FIG. 7, the question interaction module 120 of an embodiment of a client software application 104 receives interaction requests from the user when they click on interactive elements displayed as navigation links, buttons and images or complete input requests to create 142, update 180 or delete 185 a question, communicates requests and responses via the internet 108 with the question management API 122 and uses the question display module 124 to add, remove and update questions in the collection of questions being displayed.

When the user initiates a create action 142, they must select the type of question they would like to ask 143, edit the question text 144, and decide whether or not they are building a text choice or numeric input question. If they choose to build a text choice question 145 then they must decide whether or not it is a rating choice question 156 and complete the question build for a rating question by editing the rating choices 158 or editing the choices 160 and establishing the minimum required and maximum allowed choice selections 162 for a non rating question. Rating choice questions have 1 as the minimum required and maximum allowed choices by default. If the user did not choose to create a text question 145 then they would input the minimum and maximum allowable values 148, accept or change the default number of buckets 150 the numeric input will be synthesized into and, if they choose to have accept a pair of input values 154 for the question type, they would be able to select whether the input would represent two separate numbers or two numbers in a range 152. Once the user has provided the information required for the chosen type of question a question definition 136 is created 164 and, if it is a new question 166 a question create request 168, is submitted via the internet 108 to the question management API 122 of an embodiment of the system application software 110, a question create response is received 170, a call is made to the add question function 254 of the view display module 123 to add the question 176 to the view using the question create response 211 (FIG. 8) and the user is provided feedback 189.

When the user initiates a question update action 180, that in some embodiments of the present invention comprises a questionId, a question definition request 196 is submitted 182 via the internet 108 to the question management API 122, a question definition response is received 183, the question data is populated 184 from the response, the user is walked through the question build process starting with choosing a new question type 143, if desired, and progresses until a question definition 136 is created 164, a question update request 172 is submitted via the internet 108 to the question management API 122 of an embodiment of the system application software 110, a question update response is received 174, the update question function 250 of the view display module 123 is engaged to update the view based on the question update response 174 and the user is provided with feedback 189.

When the user initiates a question delete action 185, that in some embodiments of the present invention comprises a questionId, a question deletion request is submitted 186 via the internet 108 to the question management API 122, a question delete response is received 187, the remove question function 258 (FIG. 9) of the view display module 123 is called and passed the questionId to remove the question from the view display 188 and the user is provided with feedback 189.

Figure 8:
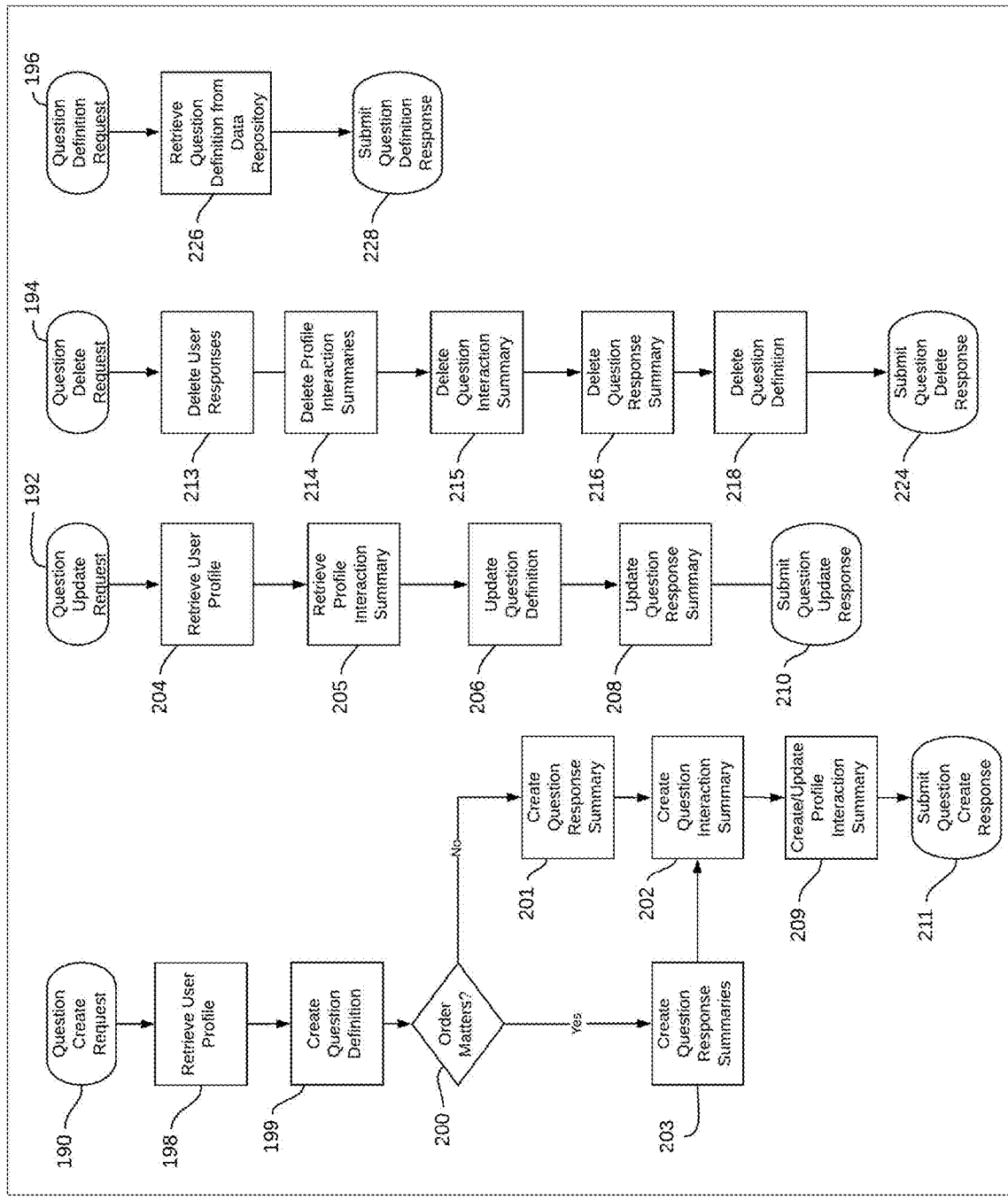
FIG. 8. is a flowchart of an embodiment of a question management application program interface (API) of a system application software used to process requests to create, retrieve, update, and delete questions in the data repository 118.

Referring now to FIG. 8, the question management API 122 of an embodiment of a system application software 110 receives:

question create requests 190, that in some embodiments of the present invention comprises a question definition, it retrieves the user's profile 198 from the data repository 118 and creates and stores a question definition 199, if order matters 200, creates question response summaries 203 to track choice order, if order does not matter 200 it creates a question response summary 201, then it creates a question interaction summary 202 and a profile interaction summary 209 in the data repository 118 and submits a question create response 211, that comprises an unresponded question 134 to the requester;

question update requests 192, that in some embodiments of the present invention comprises a question definition 136, retrieves the user's profile 204 and profile interaction summary 205 from the data repository 118, updates the question definition 206 and question response summary 208 in the data repository 118 to reflect any question definition 136 changes and submits a question update response 210, that in some embodiments of the present invention comprises an unresponded question 134 via the internet 108 to the requester, question delete requests 194, that in some embodiments of the present invention comprises a questionId, updates the data repository 118 by deleting all user responses 213, deleting all profile interaction summaries 214, deleting the question interaction summary 215, deleting the question response summary 216 and the question definition 218, associated with the questionId from the data repository 118 and submits a question delete response 224, that in some embodiments of the present invention comprises a questionId, via the internet 108 to the requester, question definition requests 196, which in some embodiments of the present invention comprises a questionId, it retrieves the question definition 226, associated with the questionId and returns a question definition response 228, that in some embodiments of the present invention comprises a question definition 136.

Figure 9:
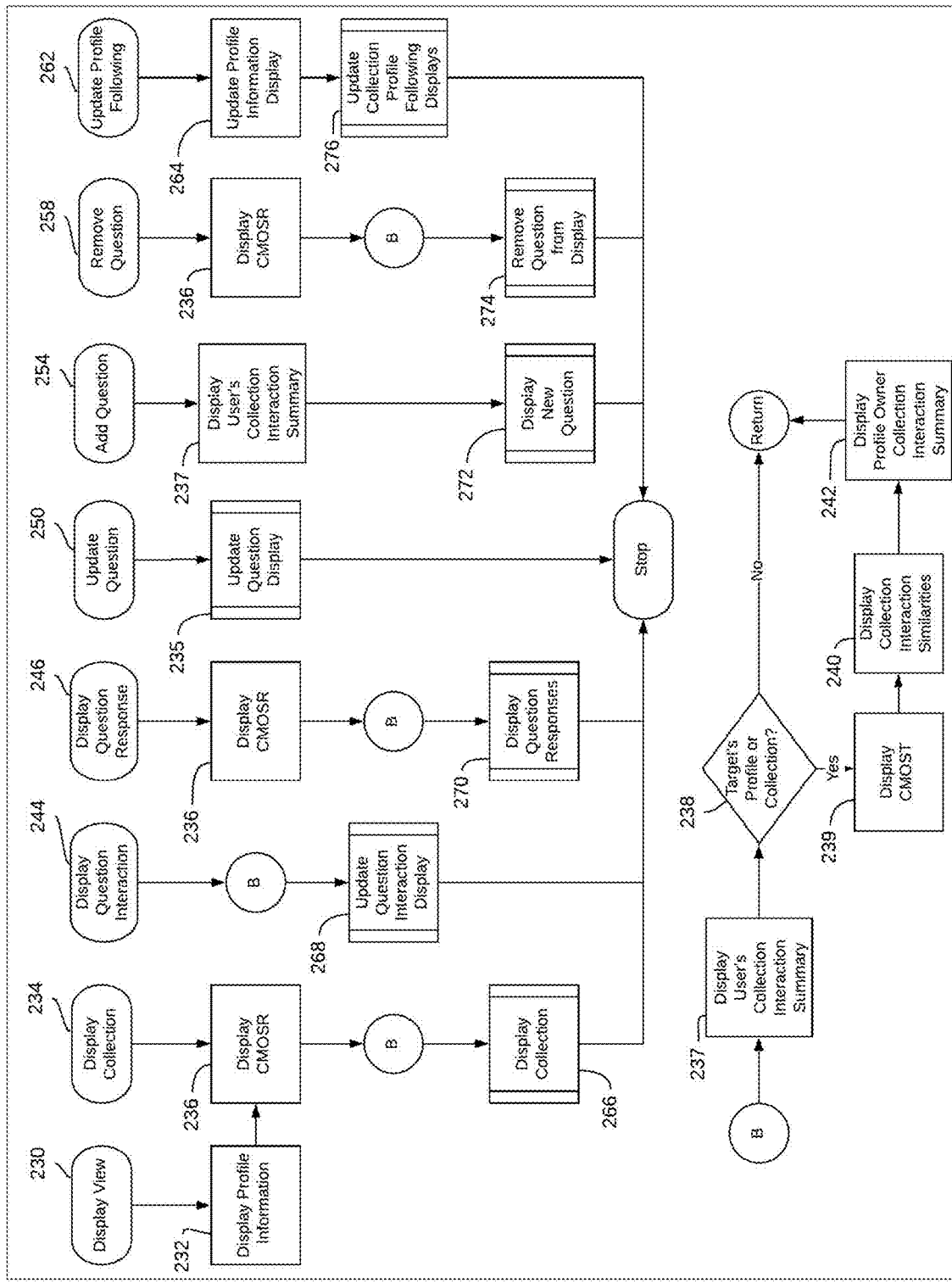
FIG. 9. is a flowchart of an embodiment of a view display functional module of a client application software that is used to manage the display of collections of questions, measures of collection similarity, and the results of navigation, and interaction with questions and users.

Referring now to FIG. 9, the view display module 123 of an embodiment of client application software 104, when the display view function 230 of the view display module 123 of an embodiment of a client application software 104 is called it is passed a view response 510 (FIG. 13), described herein, and displays a profile information display 232 that comprises:

displays of the name, description and an image associated with the profile of the view response, in other embodiments, the profile information display comprises the name, description, and image associated with the profile and a link that indicates whether or not the user is following the profile, that when activated triggers a profile following action 372 (FIG. 11) that comprises a profileId;

a CMOSR 708 display 236 that comprises a descriptive title and an interactive visual element, that is a representation of CMOSR 708, that when activated triggers a collection view action 328 (FIG. 11), that comprises the view profileId and a collectionId, to display the subset of the collection of questions that was used to compute the CMOSR 708;

a display of the user's collection interaction summary 237 display that comprises descriptive titles, counts of the number of questions in the view's collection that the user has created or interacted with and interactive elements, that when activated, trigger a collection view action 328 (FIG. 11) to display the subset of the collection of questions associated with the interaction summary;

if the profile is associated with a target user 238, a CMOST 702 display 239 that comprises a display of a descriptive title and an interactive element that shows a graphical representation of CMOST 702 that when activated triggers a collection view action 328 to display the subset of the collection of questions associated with the view request that was used to compute the CMOST 702;

if the profile is associated with a target user 238, a display of CIS 240 that comprises a list of descriptive titles, counts and interactive user interface elements, that show a representation of CIS 714, that when activated trigger a collection view action 328 to display the subset of the collection of questions associated with the interaction summary;

if the profile is associated with a target user 238, a profile owner's collection interaction summary display 242 that comprises descriptive titles, counts of the number of questions in the view's collection that the view profile owner has created or interacted with and interactive elements, that when activated, trigger a collection view action 328 to display the subset of the collection of questions associated with the interaction summary.

The display view function then calls the display collection function 279 (FIG. 10) of the question display module 124 to display the collection 266 associated with the view request.

When the display collection 234 function of the view display module 123 of an embodiment of a client application software 104 is called it is passed a collection view response 518 (FIG. 13), described herein, it displays a CMOSR 708 display 236, displays the user's collection interaction summary 237, if the profile is associated with a target user 238, then the module displays a CMOST 702 display 239, a CIS 714 display 240, a profile owner's collection interaction summary display 242 and then calls the display collection function 279 of the question display module 124 to display the collection 266 associated with the view request.

When the display question interaction function 244 of the view display module 123 is called it is passed a question interaction response 387 (FIG. 12), described herein, displays the user's collection interaction summary 237, if the profile is associated with a target user 238, then the module displays a CMOST 702 display 239, a CIS 714 display 240, a profile owner's collection interaction summary display 242 and then calls the update question interaction function 300 (FIG. 10) of the question display module 124 to update the question interaction display 268.

When the display question response 246 function of the view display module 123 is called it is passed a question response response 414 (FIG. 12), described herein, it displays a CMOSR 708 display 236, displays the user's collection interaction summary 237, if the profile is associated with a target user 238, then the module displays a CMOST 702 display 239, a display of CIS 240, a profile owner's collection interaction summary display 242 and calls the display responded question function 296 of the question display module 124 to display the display the question responses 270.

When the update question 250 function of the view display module 123 is called it is passed an unresponded question 134 and calls the update question 288 (FIG. 10) function of the question display module 124 of an embodiment of a client software application 104 to update the question display 235 based on the unresponded question.

When the add question 254 function of the view display module 123 is called it is passed a question create response 211 (FIG. 8), described herein, displays the user's collection interaction summary 237 and calls the display new question 284 (FIG. 10) function of the question display module 124 to display the new question 272.

When the remove question 258 function of the view display module 123 is called it is passed a question delete response 224, it displays a CMOSR 708, displays the user's collection interaction summary 237, if the profile is associated with a target user 238, then the module displays a CMOST 702 display 239, a display of CIS 240, a profile owner's collection interaction summary display 242 and calls the remove question function 292 (FIG. 13), described herein, of the question display module 124 to remove the question from display 274.

When the update profile following 262 function of the view display module 123 is called it is passed a profile following response 536, described herein, and it updates the profile information display 264 if required and calls the update profile following function 282 (FIG. 10), of the question display module 124 to update the collection profile following displays 276.

Figure 10:
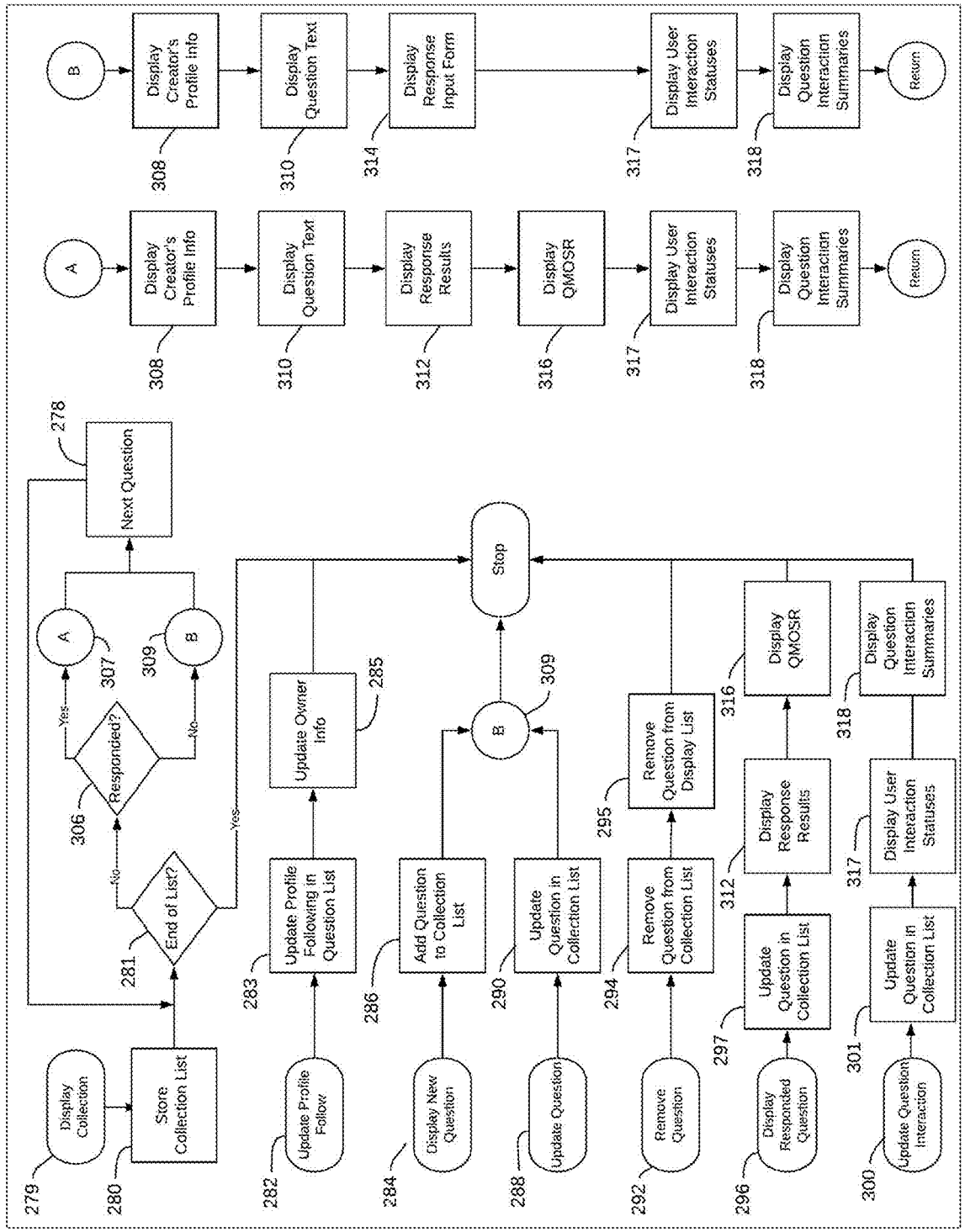
FIG. 10. is a flowchart of an embodiment of a question display module of a client application software that is used to manage the display of questions, responses, question similarity, and question and user interactions.

Referring now to FIG. 10, the question display module 124 of an embodiment of client application software 104 accepts calls to display a collection of questions 279, requests to add 284, update 288 and delete 292 questions, to display question responses 296 and interactions 300 and to update follow profile 282 status from the view display module 123.

Figure 11:
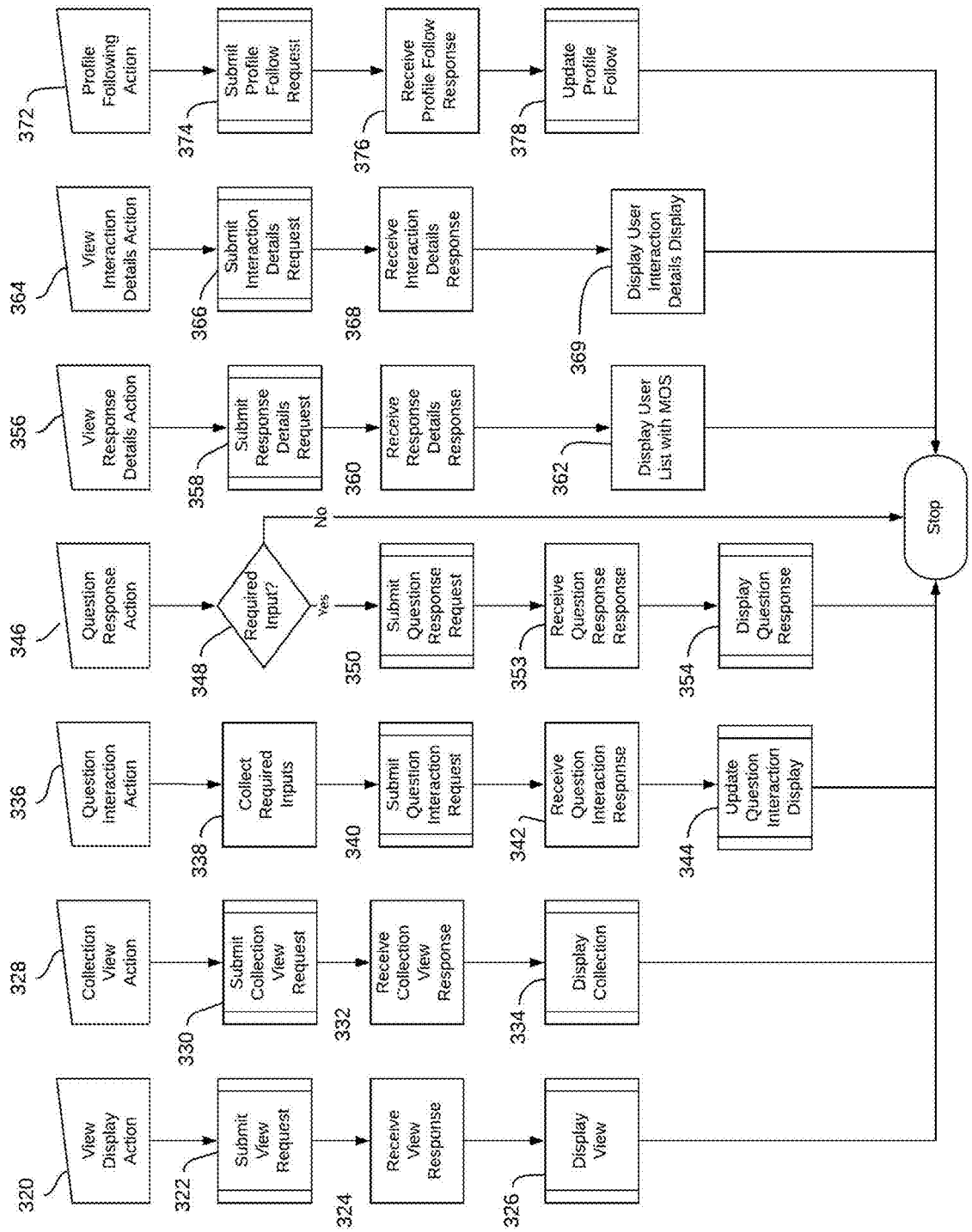
FIG. 11. is a flowchart of an embodiment of a view interaction module of a client application software that is used to interact with users to navigate, interact with, and view the results of response and interaction details with collections of questions.

When the display collection function 279 of the question display module 124 of an embodiment of system application software 110 is called, it is passed a list of unresponded 134 and responded 139 questions, it stores the list locally 280, while there are questions in the list 281 they are processed based on whether or not they have been responded to 306, as indicated by a "responded" interaction in the user's profile interaction summary 137, and displays unresponded 134 or responded 139 questions, based on whether or not the user has responded 306 to the question as indicated by a "responded" interaction in the profile interaction summary 137 of the question and then moves to the next question in the list 278. If the user has responded to the question, the function displays a responded question 139 display 307 that comprises:

a profile 135 display 308 that comprises an image associated with the question creator's profile, the profile's name and an associated interactive element, that when activated triggers a view display action 320 (FIG. 10), an image associated with the profile and an interactive element, that indicates whether or not the user is following the profile, that when activated triggers a follow profile action 372 (FIG. 11), described herein, a question text display 310 that comprises a display of the question text associated with the question definition 136, a response results display 312 that comprises a display of the 0 . . . n choices associated with the question definition 136 along with a display of the choice counts from the associated question interaction summary 138 and an associated interactive element that when activated triggers a view response details 338 action, a QMOSR 706 display 316 that comprises a display of a descriptive title and a visual representation of the QMOSR 706, a user interaction status display 317 that comprises displays of user question interaction status, based on the question's profile interaction summary 137, with interactive elements that when activated trigger a question interaction action 336 (FIG. 10), a question interaction summary 138 display 318 that comprises a display of the question interaction summary 138 associated with the question with interactive elements that when activated trigger a view interaction details request 364 (FIG. 11).

If the profile interaction summary 137 indicates that the user has not responded to the question, the function displays an unresponded question 134 display 309, that in some embodiments of the present invention comprises a profile 135 display 308, a question text display 310, a response input form 314 that comprises a display of the 0 . . . n choices associated the question definition of 136 of the question and prompts the user to make selections, as defined by the question definition 136, and an interactive element that, when activated, triggers an question response action 346 (FIG. 11), in other embodiments, the question response input form of the present invention displays input fields to accept numeric input, as defined by the question definition 136, and an interactive element that, when activated, triggers a question response action 346 of the view interaction module 125, a user interaction status display 317 that comprises displays of user question interaction status, based on the question's profile interaction summary 137, with interactive elements that when activated trigger a question interaction action 336 (FIG. 10), a question interaction summary 138 display 318 that comprises a display of the question interaction summary 138 associated with the question with interactive elements that when activated trigger a view interaction details request 364 (FIG. 11).

When the update profile follow function 282 of the question display module 124 is called it is passed a profileId and a boolean value indicating whether or not the user is "following" the profile 135 associated with a question. It updates the question profiles in the question list 283 where the question's userId matches the passed in profileId. It then updates 285 the associated interactive elements, that indicates whether or not the user is following the profile based on the input received.

When the display new question function 284 of the view display module 124 is called it is passed an unresponded question 134, adds it to the beginning of the question list being displayed 286 and then displays an unresponded question display 309 based on the unresponded question 134 that was received.

When the update question function 288 of the view display module 124 is called it is passed an unresponded question 134 that has been updated, it updates the question in collection list 290 that matches the questionId of the unresponded question input and then redisplays the unresponded question in the display.

When the remove question function 292 of the view display module 124 is called it is passed a questionId and removes the question from the list of questions in the current collection list 294 and then removes it from the question display list 295.

When the display responded question function 296 of the view display module 124 is called it is passed a profile interaction summary 137, question interaction summary 138 and a QMOSR 706. It updates the question in the collection list 297, displays a response results display 312 and displays a QMOSR 706 display 316.

When the update question interaction function 300 of the view display module 124 is called it is passed a profile interaction summary 137 and a question interaction summary 138. It updates the associated question in the collection list 301, displays a profile interactions status display 317 and displays a question interaction summary display 318.

Referring now to FIG. 11, the view interaction module 125 of an embodiment of client application software 104 responds to user actions to display a view 320, view a collection 328 and follow profile actions 372 and submits requests to, and receives responses from, the view action API 126 of a system application software 110 via the internet 108, and responds to user actions to perform question interactions 336, respond to questions 346, view response details 356 and view interaction details 364 and submits requests to, and receives responses from, the question action API 129 of a system application software 110 via the internet 108, and calls the view display module 123 to update the display of information based on the results of the user input.

The view display action 320, that in some embodiments of the present invention, comprises inputs of a profileId and a view type that it submits as a view request 322 via the internet 108 to the view action API 126 of an embodiment of an application system software 110 and receives a view response 324 and calls the display view function 230 (FIG. 9) of the view display module 123 to update the display of information 326 based on the view response.

The collection view action 328, that in some embodiments of the present invention, comprises inputs of a questionId, a userId and a collectionId and submits them as a collection view request 330 to the view action API 126 of an embodiment of system application software 110 and receives a collection view response 332. It then calls the display collection function 234 (FIG. 9) of the view display module 123 to update the display of information based on the collection view response 334.

The question interaction action 336, that in some embodiments of the present invention comprises inputs of a questionId and an interactionId, collects any inputs required 338, for example email addresses for sharing, and submits a question interaction request 340 via the internet 108 to the question action API 129 of an embodiment of system application software 110 and receives a question interaction response 342. It then calls the question interaction function 244 (FIG. 9) of the view display module 123 to update the question interaction display 354 based on the question interaction response 344.

The question response action 346, that in some embodiments of the present invention comprises inputs of a question response, validates the completeness of the required input 348 and submits 350 a question response request 388 (FIG. 10) via the internet 108 to the question action API 129 of an embodiment of a system application software 110, receives a question response response 353 and calls the display question response function 246 of the view display module 123 to update the display based on the question response response 354.

The view response details action 356, that in some embodiments of the present invention comprises a questionId and a responseId, that is the index of the choice associated with the 0 . . . n choices of the question definition 136, and submits a response details request 358 via the internet 108 to the question action API 129 of an embodiment of a system application software 110, receives a response details response 360, that is used to display a profile list and MOS display 362 that comprises a display of the list of the user's names and images associated with the profiles, visual indicators of whether or not the user is currently followed by the users associated with the profiles, interactive user interface elements with embedded profileIds that indicate whether or not the user is following the profiles, and that when activated triggers a profile following action 372, and a display of a visual representation of QMOSR 706 for each profile.

The view interaction details action 364, that in some embodiments of the present invention comprises inputs of a questionId and an interactionId and submits the inputs as an interaction details request 366 via the internet 108 to the question action API 129 of an embodiment of a system application software 110, receives an interaction details response 368 that is used to display a list of profile interaction details display 369 that comprises a display of the user name, an image associated with the returned profiles, along with a visual indication of whether or not the user is being followed by the user associated with the profile, an interactive user interface element and embedded profileId, associated with the profile, that indicates whether or not the user is following the user associated with the profile, and that when activated triggers a follow profile action 372, and a display of a visual representation of the similarity of question interactions between the user and the user associated with the profile.

The profile following action 372, that in some embodiments of the present invention comprises inputs of a profileId, submits the input as a follow profile request 374 via the internet 108 to the view action API 126 of an embodiment of a system application software 110, receives a follow profile response 376 and includes the follow profile response as input to the update profile following 262 (FIG. 9) function of the view display module 123 to update the view display 378.

Figure 12:
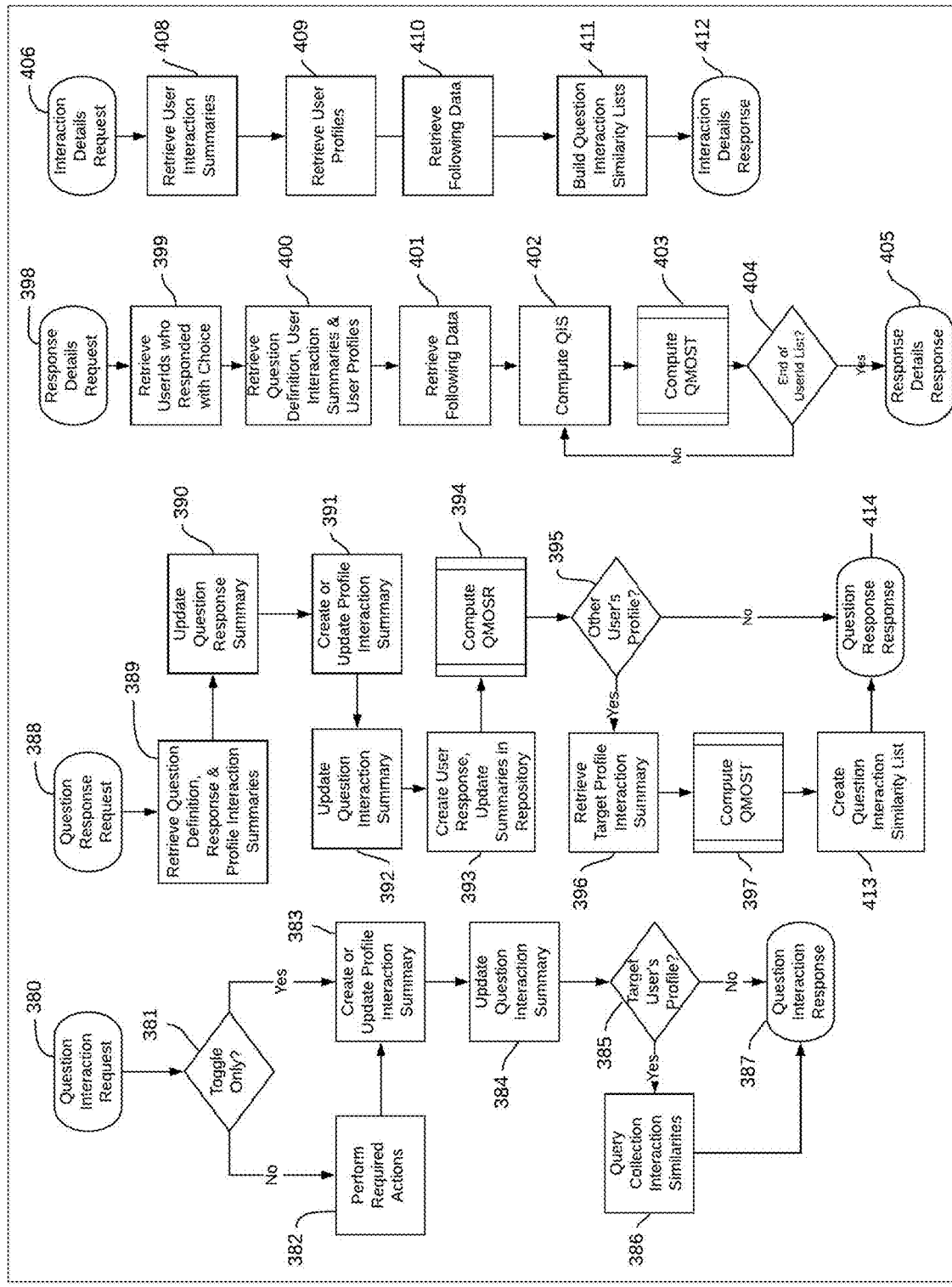
FIG. 12. is a flowchart of an embodiment of a question action API of a system application software that is used to process requests for question responses, interactions, and details of responses and interactions.

Referring now to FIG. 12, the question action API 129 of an embodiment of a system application software 110 receives:

question interaction requests 380, that in some embodiments of the present invention comprises a questionId of the question being interacted with, ownerId associated with the current profile of the view being displayed, and an interactionId that identifies the interaction being requested and any additional inputs, for example an email address for sharing a question, associated with the interaction request, if it is not a toggle only interaction 381 (e.g. watching, liked) it performs required actions 382 associated with the interaction request 380, such as sending notifications for shares, creates or updates a profile interaction summary 383, updates the question interaction summary 384 in the data repository 118, captures the current state of the interaction from the profile interaction summary 137, if the ownerId is a target userId 385, it queries the data repository 118 for a list of QIS 386 and returns a question interaction response 387, that comprises a questionId and a boolean value based on the state of the interaction in the profile interaction summary 137, and, if the ownerId is a target user, a QIS 386 list to the requester, question response requests 388, that in some embodiments of the present invention comprises a question response and ownerId associated with the current profile of the view being displayed, retrieves the data 389, updates the question response summary 390, creates or updates a profile interaction summary 391 and updates the question interaction summary 392 based on the question response request 388, calls the compute QMOSR 420 function of the MOS module 130 to compute 394 QMOSR 706, if the ownerId is associated with a target user profile 395 it retrieves the target profile interaction summary 396, calls the compute CMOST 470 function of the MOS module 130 to compute 397 CMOST and queries the data repository 118 for a list of QIS between the user and the target user 413 and returns a question response response 397 that comprises a questionId, a question response summary 562, a profile interaction summary 137, QMOSR 706, in other embodiments of the present invention, the question response response 395 comprises a questionId, a question response summary 562, a profile interaction summary 137, QMOSR 706, CMOST 702 and CIS list, to the requester, response details requests 398, that in some embodiments of the present invention comprises a questionId and a responseId, it retrieves a list of userIds for respondents who selected the responseId when they responded to the question 399, retrieves 400 the question definition 136 associated with the questionId, the profile interaction summaries 137 for the respondents and the user, retrieves user profiles for the list of userIds and retrieves the user following and being followed statuses 401 from the data repository 118, and loops through the list of userIds 404 and computes QIS 712 by comparing the user's and target users' profile interaction summaries, for each user, and creates a list of interactions and associated values that indicate whether or not one or both of the users have had similar interactions, for example 0 means neither have had the interaction, 1 means only the user had the interaction, 2 means only the target had the interaction, and 3 means both user and target have had the interaction, then calls 403 the compute QMOST function 450 of the MOS module 130 to compute the QMOST 700 between the user and the profile of the target respondent 403 and returns a response details response 405 that comprises a list of user profiles with an associated QMOST 700 and list of QIS 712, a boolean value that indicates whether or not the user is following the user associated with the profile and a boolean value indicating whether or not the user is being followed by the user associated with the profile, interaction details requests 406, that in some embodiments of the present invention comprises a questionId and an interactionId, it retrieves 408 the profile interaction summaries 137 for the user and other users who have an interaction associated with the interactionId 408 that is true and matches the questionId, retrieves user profiles 409 for the users associated with the profile interaction summaries 137 and retrieves the user following and being followed statuses 410 from the data repository 118, then builds a QIS 712 list 411, that comprises a list of common question interactions, between the user and each of the other users and returns an interaction details response 412 that comprises a list of user profiles and a summary of common interacts between the user and each profile, a boolean value that indicates whether or not the user is following the user associated with each profile and a boolean value indicating whether or not the user is being followed by the user associated with each profile.

Figure 13:
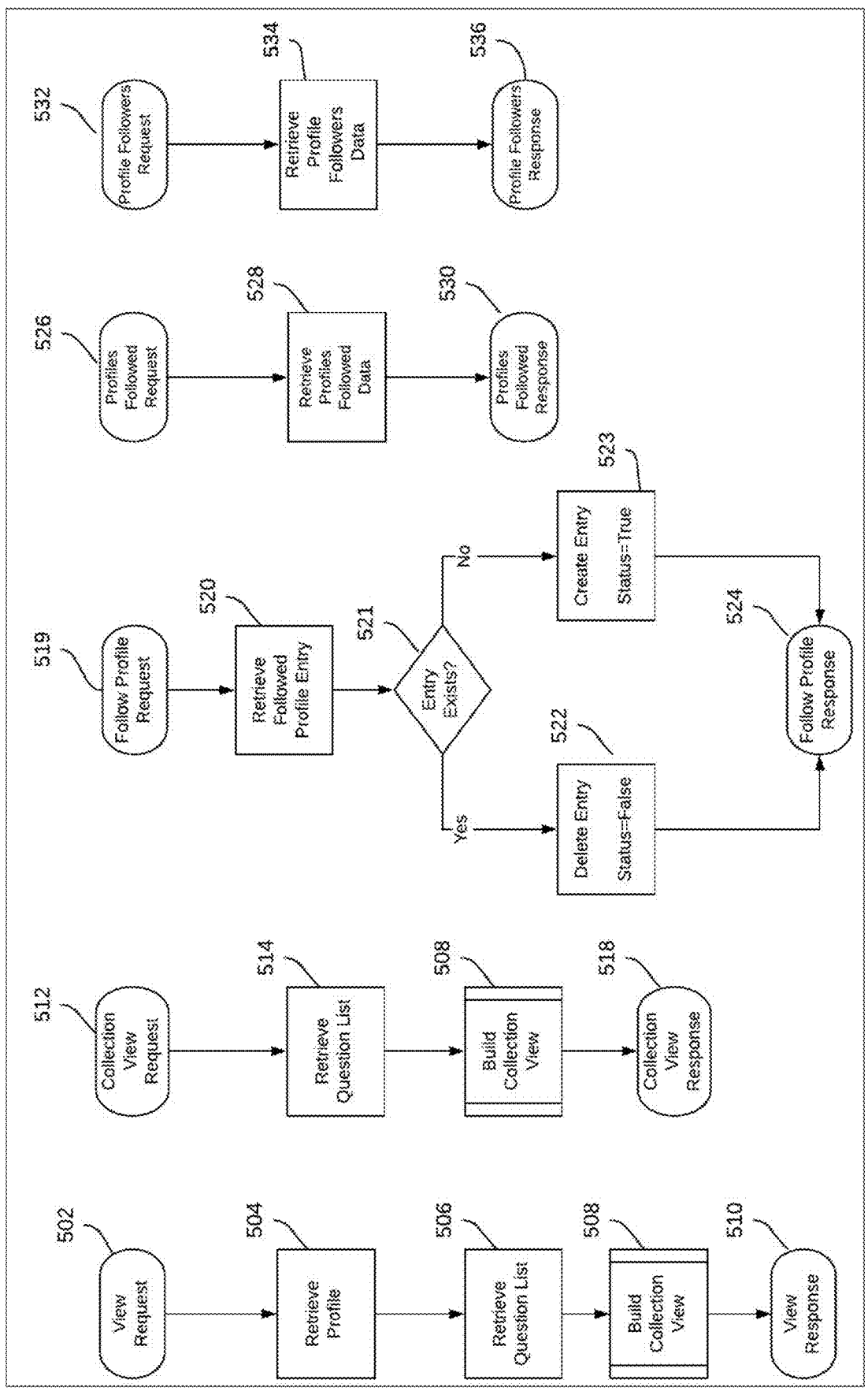
FIG. 13. is a flowchart of an embodiment of a view action API of a client application software that is used to process requests to navigate view of a users' collection of question, collections associated with users and user interactions.

Referring now to FIG. 13, the view action API 126 of an embodiment of a system application software 110 receives:

view requests 502, that in some embodiments of the present invention comprises a profileId and a view type, the profile associated with the profileId is retrieved from the data repository 504, a default list of questionIds and question creatorIds (userIds) associated with the profileId that was received are retrieved 506 from the data repository 118, the profileId, view type and list of questionIds and creatorIds profileIds is passed to the build collection view function 538 of the collection build module 127 to build the collection view 508, based on the list of questionIds and creatorIds, and uses the returned collection view 538 (FIG. 14) to create a view response 510 that comprises a view type, a profile associated with a collection of questions and a collection view to the requester, collection view requests 512, that in some embodiments of the present invention comprises a profileId, a view type and a collectionId, it executes a query based on the collectionId to retrieve the list of questionIds and creator profileIds

514, passes the list to the build collection function 538 (FIG. 14) of the collection build module 127 to build the collection view 508 that it returns to the requester 518, follow profile requests 519, that in some embodiments of the present invention comprises a profileId, the data repository 118 is queried for a followed profile entry 520 where the profileId is the followed id. If a followed profile entry exists 521 it is deleted 522 and the profile followed status is set to false otherwise an entry is created 523 in the data repository 118 with userId being the follower and the profileId being the followedId and the followed profile status is set to true and it returns a follow profile response 524 that comprises a profileId and boolean value that indicates the current state of the user following the profileId, to the requester, profiles followed requests 526, that in some embodiments of the present invention requires no input, a list of profiles that have a related followed profile entry where the userId is the followerId retrieved 528 from the data repository 118 and a profiles followed response 530, that comprises a list of user profiles with a boolean value that indicates whether or not the user is following the user associated with the profile and a boolean value indicating whether or not the user is being followed by the user associated with the profile, is created and returned to the requester, profile followers requests 532, that in some embodiments of the present invention requires no input, a list of profiles that have a related followed profile entry where the userId is the one followed is retrieved from the data repository 534 and it is used to create a profile followers response 536 that comprises a list of user profiles with a boolean value that indicates whether or not the user is following the user associated with the profile and a boolean value indicating whether or not the user is being followed by the user associated with the profile, that is returned to the requester.

Figure 14:
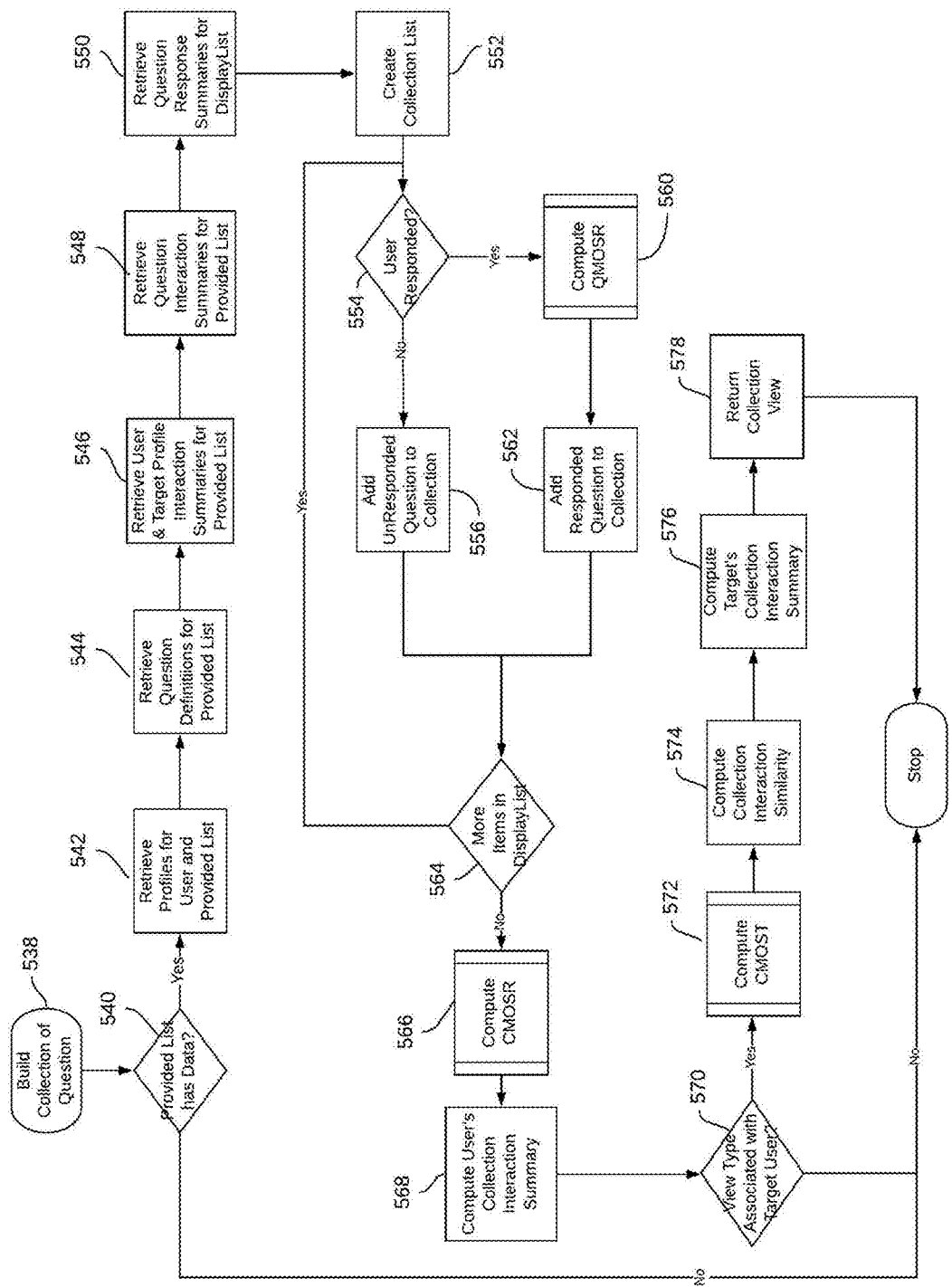
FIG. 14. is a flowchart of a collection build module of a system application software that is used to synthesize the question architecture into a consistent data representation of questions, interactions, and measures of similarity.

Referring now to FIG. 14, the collection build module of an embodiment of a client software application 104 receives a request to build a collection of questions 538, that in some embodiments of the present invention comprises a target profileId, view type and a list of questionIds and associated ownerIds that retrieves 542 the profiles 135 (FIG. 3) for the user and userIds associated with the provided that was passed to the function, retrieves 544 the question definitions 136, 546 the user and target profile interactions summaries 140, retrieves 548 the question interaction summaries 138, and retrieves 550 the question response summaries 140 associated with the provided list of questions and userIds, creates a new list to return the collection 552, and loops 564 through the provided list and if the user has not responded 554, an unresponded question 134 (FIG. 3) is assembled from the retrieved data and added to the collection 556, if the user responded 554, QMOSR 706 is computed for the question 560 and a responded question is assembled and added to the collection, until there are no more questions 564 in the provided list.

The compute CMOSR function 433 (FIG. 5) is called 566 and passed the list of QMOSRs for responded questions in the collection, the number of buckets and whether or not order matters associated with each responded question, and the number of user choice selections associated with each question and returns a CMOSR 437 for the collection, and computes a summary by interaction type, of the number of interactions 568 that the user has had with the questions in the list.

If the view type is associated with a target user 570 then CMOST 702 is computed 572 by passing the question selections from the user and target profile interaction summaries 137, the minimum number of selections, number of buckets, and whether or not order matters from the question definition 136 to the compute CMOST (470 FIG. 5) function of the MOS module 130 (FIG. 2) that returns a CMOST 702, a collection interaction similarity CIS 714 is computed by counting the number of common interactions between the user and the target for the questions in the collection, and computes a summary, by interaction type, of the number of interactions 576 that the user has had with the questions in the collection, finally a collection view 578 that comprises a profileId, view type, CMOSR 708, a collection interaction summary of the user's interaction with questions in the collection, and a collection that comprises a list of responded and unresponded questions, in other embodiments of the present invention a collection view 578 comprises a profileId, view type, CMOSR 708, CMOST 702, a CIS 714 that provides a list of common interactions between the user and target user associated with the collection, a collection interaction summary of the user's interaction with questions in the collection, a collection interaction summary of the target's interactions with questions in the collection, and a collection that comprises a list of responded and unresponded questions, is created and returned.

Figure 15:
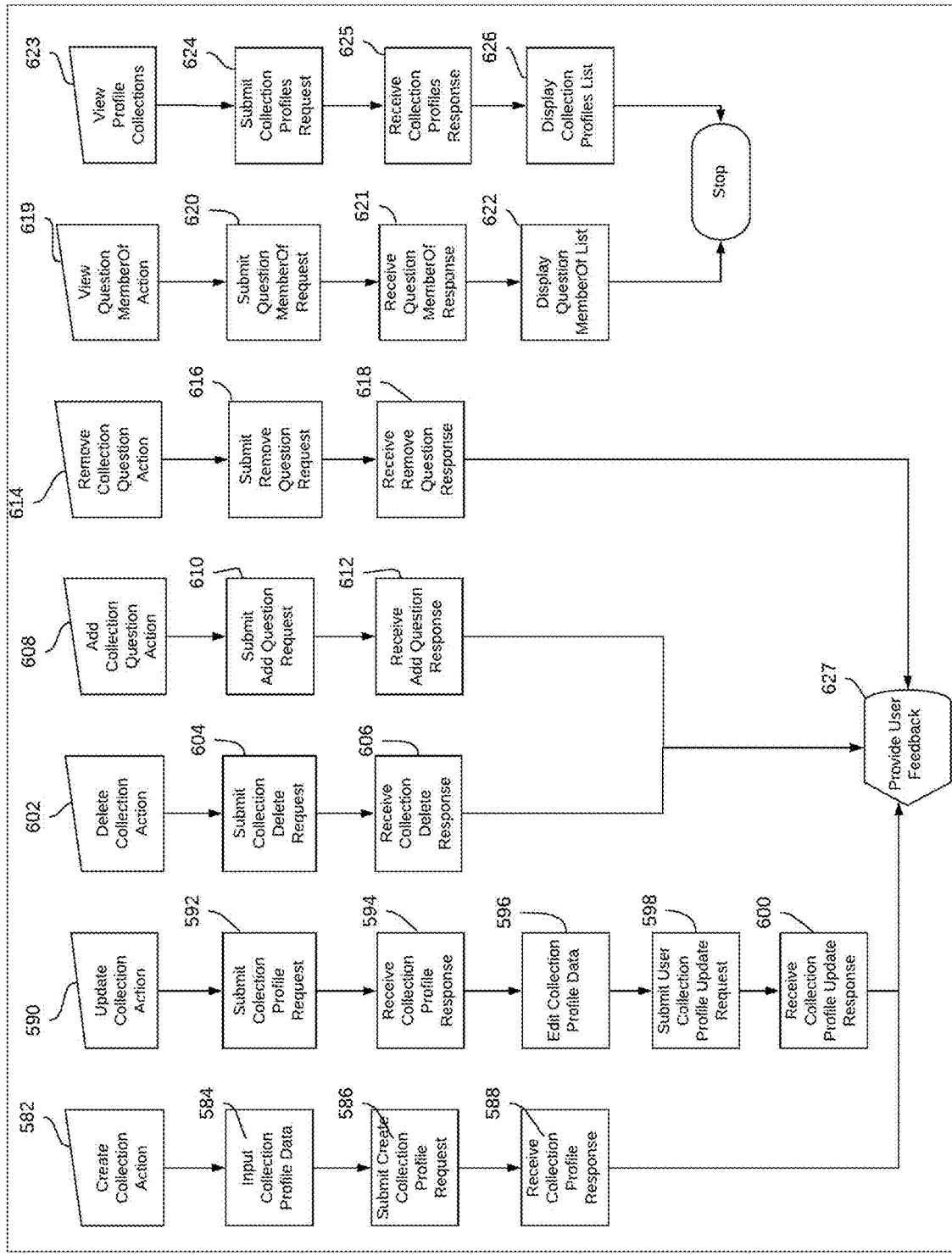
FIG. 15. is a flowchart of an embodiment of a user collection interaction module of a client application software that is used to interact with users to manage the creation and navigation of user defined collections of questions.

Referring now to FIG. 15, the user collection interaction module 131 of an embodiment of a client software application 104 receives interaction requests from the user when they click on interactive elements displayed as navigation links, buttons or images or complete input requests to create 582, update 590 or delete 602 a user collection, add 608 and remove 615 questions to/from user collections, view collections that a question is a member of 619 and view profile collections 623, it communicates requests to, and processes responses received from, the collection management API 132 via the internet 108.

When the user initiates a create collection action 582, the user is prompted to input the name of the collection, a description, an image, and html links to social media and web addresses associated with the collection 584, that are submitted as a create collection profile request 586, a collection profile response is received 588 and finally, the user is provided feedback on the collection creation 627.

When the user initiates an update collection action 590, that in some embodiments of the present invention comprises a profileId, a collection profile request 592 is submitted to the collection management API 132 and a collection profile response 594, that comprises a collection profile, is received and the user is prompted to edit the collection profile data 596, when the user is done editing a collection profile update request 598 is sent to the collection management API 132, a collection profile update response 600 is received and the user is provided feedback 627.

When the user initiates a delete collection action 602, that in some embodiments of the present invention comprises a collection profileId, a collection delete request 604 is submitted to the collection management API 132 and a collection delete response 606 is received and the user is provided feedback 627.

When the user initiates an add collection question action 608, that in some embodiment of the present invention comprises a collection profileId and a questionId, an add question request 609 is submitted to the collection management API 132 and an add question response 610 is received and the user is provided feedback 627.

When the user initiates a remove collection question action 615, that in some embodiment of the present invention comprises a collection profileId and a questionId, a remove question request 616 is submitted to the collection management api 132 and a remove question response 618 is received and the user is provided feedback 627.

When the user initiates a view question member Of request action 619, that in some embodiment of the present invention comprises a questionId, a question member Of request 620 is submitted to the collection management API 132 and a question member Of response 621 is received and the user is presented with a profile list display 622 that comprises a display of a listing of each profile name, an associated interactive element with the profileId embedded, that when activated triggers a view display action 320 (FIG. 11), an image associated with the profile, an interactive user interface element, with the profileId embedded, that indicates whether or not the user is following the profile, that when activated triggers a follow profile action 372.

When the user initiates a view profile collections request 623, that in some embodiments of the present invention comprises a profileId, a collection profiles request 624, that comprises a profileId, is submitted to the collection management API 132 of an embodiment of an application software 110, a collection profiles response 625, that comprises a list of collection profiles and associated profile following data, is received and a the user is presented with a profile list display 626.

Figure 16:
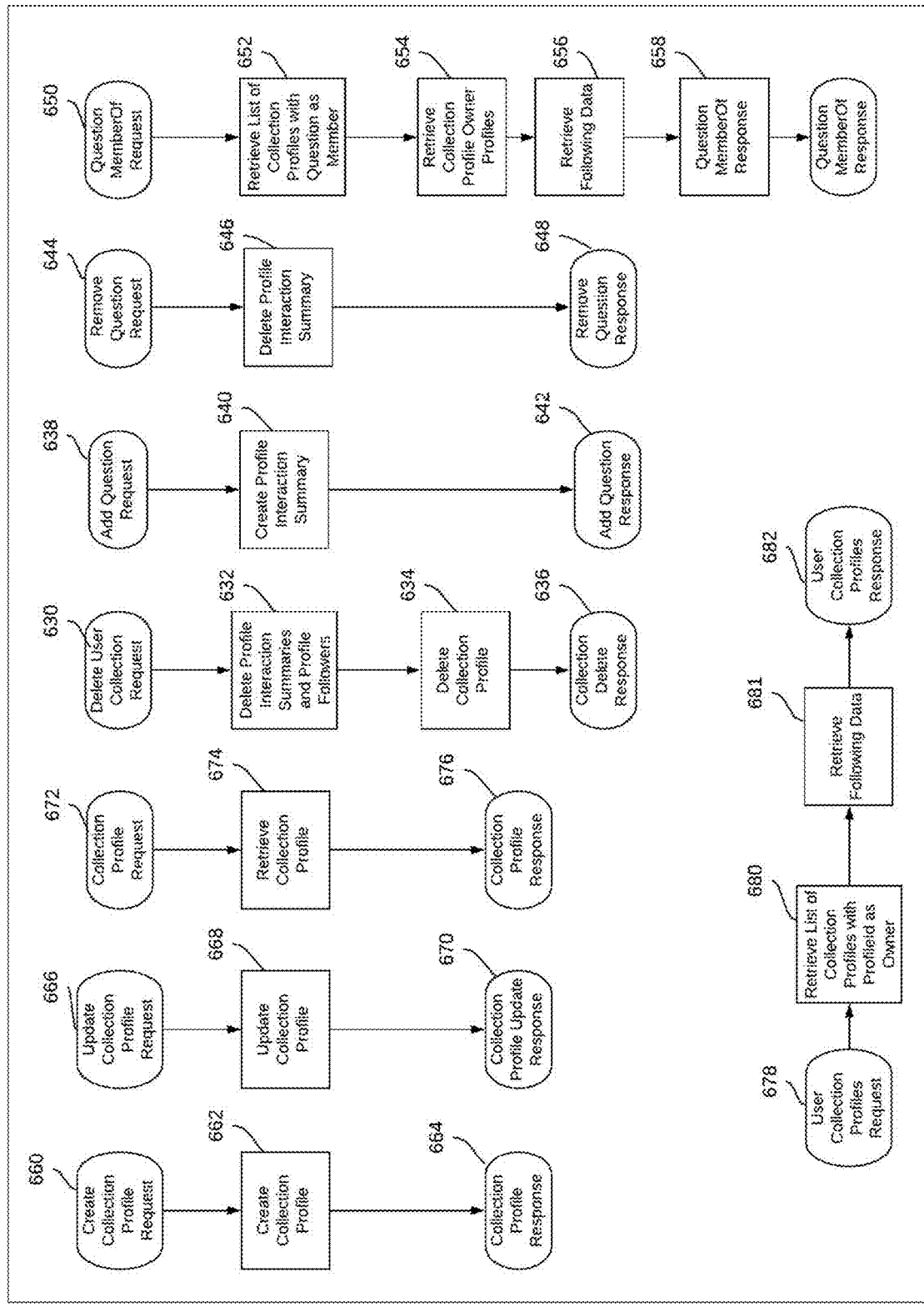
FIG. 16. is a flowchart of an embodiment of a user collection management API of a system application software that is used to process request for the creation and navigation of user defined collections of questions.

Referring now to FIG. 16, the collection management API 132 of an embodiment of a system application software 110 receives:

create collection profile requests 660, that in some embodiments of the present invention comprises a name, description, hyperlink to a multimedia file and hypertext links to social media and web sites, creates a profile 662 based on the received information in the data repository 118 and returns a user collection profile create response 664 that comprises a profileId, userId, name, description, a hyperlink to a multimedia file and hypertext links to social media and web sites to the requestor, update collection profile requests 666, that in some embodiments of the present invention comprises a user collection profile, updates the profile 668 in the data repository 118 and returns a collection profile update response 670 to the requestor, collection profile requests 672, that in some embodiments of the present invention comprises a profileId, retrieves the profile 674 in the data repository 118 and returns a collection profile response 676 to the requestor, delete user collection requests 630, that in some embodiments of the present invention comprises a profileId, deletes all profile interaction summaries 137 and profile follower entries 632 associated with the profileId from the data repository 118, deletes the profile 634 associated with the profileId and returns a collection delete response 636 that comprises the profileId of the deleted collection profile, add question requests 638, that in some embodiments of the present invention comprises a profileId, creates a profile interaction summary 137 associated with the profileId and questionId 640 and returns an add question response 642 that comprises the questionId of the added question, remove question requests 644, that in some embodiments of the present invention comprises a profileId and a questionId, deletes the profile interaction summary 137 associated with the profileId and questionId 646 from the database 118 and returns a remove question response 648 that comprises the questionId of the removed question, question member Of requests 650, that in some embodiments of the present invention comprises a questionId, retrieves a list of user collection profiles 652 where the profile interaction summary 137 has a questionId that matches the request questionId and the profile, associated with the profile interaction summary 137, is a collection profile, retrieves the user profiles 654 associated with the userId of previously retrieved profiles, retrieves a profile following entry 656, if one exists, for each of the profiles in the list, and creates and returns a question member Of response 658 that comprises a list of collection profiles with an associated boolean value for each profile that indicates whether or not the user is following the user collection profile and a profile associated with the userId to the requestor 650.

Collection profiles requests 678, that in some embodiments of the present invention comprises a profileId, retrieves a list of user collection profiles 680 where the profile ownerId matches the profileId associated with the request, and is a collection profile, retrieves a profile following entry 681, if one exists, for each of the profiles in the list, and creates and returns a collection profiles list 682 that comprises a list of collection profiles with an associated boolean value for each profile that indicates whether or not the user is following the user collection profile to the requester.

What is claimed is:

1. A computer-implemented method of converting an end user-inputted question into a data architecture configured to determine a measure of similarity between a plurality of end users of an online social network, the method comprising:

providing the online social network system comprising an application server in operable communication with a computer network, the application server comprising one or more processors for executing computer-executable application logic; and a data repository configured to retrievably store information comprising a plurality of end user-inputted questions, responses, and interactions;

receiving a communication transmitted from an end user via an end user device with access to the online social network, the communication comprising the end user-inputted question;

saving to the data repository the end user-inputted questions;

generating, via the application logic, the data architecture for the respective question, the data architecture comprising a question response summary, a question interaction summary, and an end user profile interaction summary, wherein the question response comprises data associated with a submitted choice selection or numeric input, and the question interaction comprises an end user action including responded, liked, watching, and shared;

assigning attributes of the end user-inputted question to the data architecture; and generating a weight for the respective question based on the assigned attributes, wherein the attributes of the end user-inputted question comprise a question type, a question complexity score, a number of response choices, a number of interaction options, and an association with a collection of questions;

receiving one or more further communications transmitted from one or more further end users via their respective end user devices with access to the online social network, the one or more further communications comprising an end user-inputted response or interaction associated with the end user-inputted question;

saving to the data repository the one or more further communications; and generating the measure of similarity between the one or more further end users based on their respective responses or interactions associated with the respective question and the weight generated for the respective question.

2. The method of claim 1, wherein the attributes of the end user-inputted question further comprises an identification of the respective question as a responded question or an unresponded question.

3. The method of claim 1, wherein the question response summary retrieves and displays a total number of end users who responded to the respective question and a total number of times a response choice was selected by the total number of end users as their respective response.

4. The method of claim 1, wherein the question interaction summary retrieves and displays a total number of times the respective question receives an interaction and the respective end users who inputted the respective interaction.

5. The method of claim 1, wherein the end user profile interaction summary retrieves and displays the questions, responses, and interactions inputted for each respective end user device.

6. The method of claim 1, wherein the weight generated for the respective question is based on a question type assigned to the respective question, and any responses or interactions associated with the respective question.

7. The method of claim 1, wherein the respective question is one of a plurality of questions in a collection.

8. The method of claim 1, wherein the measure of similarity between the one or more further end users is for:
   a specific end user and all other end users who responded to the respective question;
   all end users who responded to the respective question;
   a pair of specific end users who responded to a collection comprising the respective question; or
   the specific end user and all other users who responded to the collection comprising the respective question.

9. The method of claim 1, wherein the measure of similarity between the one or more further end users is for a specific end user and all other end users who responded to the respective question or for all end users who responded to the respective question; and
   wherein the measure of similarity comprises:
   a permutation of response choices for the respective question;
   a question complexity score based on a question type assigned to the respective question and a number of response choices;
   a number of required question choices; and
   if the predetermined number of required response choices is greater than one, then an indication whether an order of selecting the required choices is captured.

10. The method of claim 1, further comprising displaying the measure of similarity between the one or more further end users, wherein a specific end user display is adjustable based on any end user inputted question, question responses, question interactions, measure of similarity, end user actions within the online social network, and end user defined collections of questions.

11. An online social network system for converting an end user-inputted question into a data architecture configured to determine a measure of similarity between a plurality of end users of the online social network, comprising:
   an application server comprising one or more processors for executing computer-executable application logic;
   a data repository configured to retrievably store information comprising a plurality of end user-inputted questions, end user-inputted responses, and end user-inputted interactions; and
   a plurality of end user devices in communication with the application server, wherein each respective end user device comprises client logic configured to transmit to the application server a communication comprising the end user-inputted question, a response, or an interaction;
   wherein the application logic is configured to store, retrieve, analyze, and search for the information stored in the data repository, and to receive the communication transmitted from the client logic;
   wherein, responsive to the end user-inputted question transmitted from the end user device, the application logic is configured to: generate the data architecture for the respective question, the data architecture comprising a question response summary, a question interaction summary, and an end user profile interaction summary; assign attributes of the respective question to the data architecture; and generate a weight for the respective question, wherein the weight is based on assigned attributes, wherein the attributes of the end user-inputted question comprise a question type, a question complexity score, a number of response choices, a number of interaction options, and an association with a collection of questions; and
   wherein the question response comprises data associated with a submitted choice selection or numeric input, and the question interaction comprises an end user action including responded, liked, watching, and shared; and
   wherein the application logic is further configured to determine the measure of similarity between the plurality of end users based on their respective responses to or interactions with the respective question and the weight generated for the respective question.

12. The system of claim 11, wherein the question response summary retrieves and displays a total number of end users who responded to the respective question and a total number of times a response choice was selected by the total number of end users as their respective response.

13. The system of claim 11, wherein the question interaction summary retrieves and displays a total number of times the respective question receives an interaction and the respective end users who inputted the respective interaction.

14. The system of claim 11, wherein the end user profile interaction summary retrieves and displays the questions, responses, and interactions inputted for each respective end user device.

15. The system of claim 11, wherein the weight generated for the respective question is further based on a question type assigned to the respective question, a predetermined number of predefined response choices made available for the respective question, and whether the predefined response choices are captured in a specific order.

16. The system of claim 11, wherein the respective question is one of a plurality of questions in a collection.

17. The system of claim 11, wherein the measure of similarity between the plurality of end users is for:
   a specific end user and all other end users who responded to the respective question;
   all end users who responded to the respective question;
   a pair of specific end users who responded to a collection comprising the respective question; or the specific end user and all other end users who responded to the collection comprising the respective question.

18. The system of claim 11, wherein the measure of similarity between the plurality of end users is for a specific end user and all other end users who responded to the respective question or for all end users who responded to the respective question; and
wherein the measure of similarity comprises:
a permutation of response choices for the respective question;
a question complexity score based on a number of response choices;
a number of required question choices; and
if the number of required response choices is greater than one, then an indication whether an order of answering the required choices is required.

19. The system of claim 11, further comprising logic for displaying the measure of similarity between the one or more further end users, wherein a specific end user can navigate views on a display based on any end user inputted question, question responses, question interactions, measure of similarity, end user actions within the online social network, and end user defined collections of questions.

20. A computer-implemented method of converting an end user-inputted question into a data architecture configured to determine a measure of similarity between a plurality of end users of an online social network, the method comprising:
providing the online social network system comprising an application server in operable communication with a computer network, the application server comprising one or more processors for executing computer-executable application logic; and a data repository configured to retrievably store information comprising a plurality of end user-inputted questions, responses, and interactions;
receiving a communication transmitted from an end user via an end user device with access to the online social network, the communication comprising the end user-inputted question;
saving to the data repository the end user-inputted questions;
generating, via the application logic, the data architecture for the respective question, the data architecture comprising a question response summary, a question interaction summary, and an end user profile interaction summary, wherein the question response comprises data associated with a submitted choice selection or numeric input, and the question interaction comprises an end user action including responded, liked, watching, and shared;
assigning attributes of the end user-inputted question to the data architecture; and
generating a weight for the respective question based on the assigned attributes;
receiving one or more further communications transmitted from one or more further end users via their respective end user devices with access to the online social network, the one or more further communications comprising an end user-inputted response or interaction associated with the end user-inputted question;
saving to the data repository the one or more further communications; and
generating the measure of similarity between the one or more further end users based on their respective responses or interactions associated with the respective question and the weight generated for the respective question;
wherein the measure of similarity between the one or more further end users comprises:
a permutation of response choices for the respective question;
a question complexity score based on a question type assigned to the respective question and a number of response choices;
a number of required question choices; and
if the predetermined number of required response choices is greater than one, then an indication whether an order of selecting the required choices is captured.

21. An online social network system for converting an end user-inputted question into a data architecture configured to determine a measure of similarity between a plurality of end users of the online social network, comprising:
an application server comprising one or more processors for executing computer-executable application logic;
a data repository configured to retrievably store information comprising a plurality of end user-inputted questions, end user-inputted responses, and end user-inputted interactions; and
a plurality of end user devices in communication with the application server, wherein each respective end user device comprises client logic configured to transmit to the application server a communication comprising the end user-inputted question, a response, or an interaction;
wherein the application logic is configured to store, retrieve, analyze, and search for the information stored in the data repository, and to receive the communication transmitted from the client logic;
wherein, responsive to the end user-inputted question transmitted from the end user device, the application logic is configured to: generate the data architecture for the respective question, the data architecture comprising a question response summary, a question interaction summary, and an end user profile interaction summary; assign attributes of the respective question to the data architecture; and generate a weight for the respective question, wherein the weight is based on assigned attributes; and
wherein the question response comprises data associated with a submitted choice selection or numeric input, and the question interaction comprises an end user action including responded, liked, watching, and shared; and
wherein the application logic is further configured to determine the measure of similarity between the plurality of end users based on their respective responses to or interactions with the respective question and the weight generated for the respective question; and
wherein the measure of similarity between the plurality of end users comprises:
a permutation of response choices for the respective question;
a question complexity score based on a question type assigned to the respective question and a number of response choices;
a number of required question choices; and
if the predetermined number of required response choices is greater than one, then an indication whether an order of selecting the required choices is captured.

* * * * *